(12) United States Patent
Pietola et al.

(10) Patent No.: US 11,104,409 B2
(45) Date of Patent: Aug. 31, 2021

(54) SYSTEM FOR MANOEUVRING A BOAT

(71) Applicant: G-Boats Oy, Helsinki (FI)

(72) Inventors: Paavo Pietola, Helsinki (FI); Markku Ihonen, Helsinki (FI)

(73) Assignee: G-Boats Oy, Helsinki (FI)

( * ) Notice: Subject to any disclaimer, the term of this patent is extended or adjusted under 35 U.S.C. 154(b) by 369 days.

(21) Appl. No.: 16/177,125

(22) Filed: Oct. 31, 2018

(65) Prior Publication Data

US 2019/0135400 A1    May 9, 2019

Related U.S. Application Data

(63) Continuation-in-part of application No. 16/176,911, filed on Oct. 31, 2018, which is a continuation-in-part
(Continued)

(51) Int. Cl.
*B63H 25/04* (2006.01)
*B63B 43/18* (2006.01)
(Continued)

(52) U.S. Cl.
CPC ............ *B63H 25/04* (2013.01); *B63B 39/08* (2013.01); *B63B 43/18* (2013.01); *B63B 59/02* (2013.01); *B63H 11/04* (2013.01); *B63H 25/46* (2013.01); *G05D 1/0088* (2013.01); *G05D 1/0208* (2013.01); *B63B 2043/185* (2013.01); *B63B 2059/025* (2013.01); *B63H 2011/008* (2013.01); *B63H 2025/026* (2013.01)

(58) Field of Classification Search
CPC ........ B63H 25/04; B63H 11/04; B63H 25/46; B63H 2025/026; B63H 2011/008; B63B 43/18; B63B 59/02; B63B 39/08; B63B 2059/025; B63B 2043/185; G05D 1/0088; G05D 1/0208
USPC .......................................................... 701/21
See application file for complete search history.

(56) References Cited

U.S. PATENT DOCUMENTS 2,276,193 A    3/1942 Keenan
3,201,092 A    8/1965 Skraban
(Continued)

FOREIGN PATENT DOCUMENTS

CN    106184647 A    12/2016
CN    105473790 B    3/2017
(Continued)

*Primary Examiner* — Muhammad Shafi
(74) *Attorney, Agent, or Firm* — Laine IP Oy

(57) ABSTRACT

A system for manoeuvring a boat with fenders is described. A plurality of water nozzles is provided on the boat. Further, a plurality of pumps is operated by an artificial intelligence module and/or control unit and powered by the power source 130 of the boat. The plurality of pumps is primed continuously to reduce response time to control the plurality of pumps and each of the plurality of pumps is connected to one water nozzle. A plurality of sensors is configured to monitor the state of motion of the boat. Further, an artificial intelligence module is in communication with the plurality of water nozzles, the plurality of pumps, and the plurality of sensors. The artificial intelligence module is configured to keep the boat in a stationary standstill or on a chosen course of motion.

21 Claims, 14 Drawing Sheets

Related U.S. Application Data of application No. 16/175,595, filed on Oct. 30, 2018, now abandoned.

(60) Provisional application No. 62/582,165, filed on Nov. 6, 2017.

(51) Int. Cl.
| | |
|---|---|
| *B63B 59/02* | (2006.01) |
| *B63B 39/08* | (2006.01) |
| *B63H 11/04* | (2006.01) |
| *B63H 25/46* | (2006.01) |
| *G05D 1/00* | (2006.01) |
| *G05D 1/02* | (2020.01) |
| *B63H 25/02* | (2006.01) |
| *B63H 11/00* | (2006.01) |

(56) References Cited

U.S. PATENT DOCUMENTS

| | | | |
|---|---|---|---|
| 3,422,783 A | | 1/1969 | Moulin |
| 3,934,416 A | | 1/1976 | Goldkuhle et al. |
| 3,945,201 A | | 3/1976 | Entringer |
| 3,988,997 A | * | 11/1976 | Fenton .................. B63B 59/02 |
| | | | 114/219 |
| 4,480,817 A | | 11/1984 | Koshoji et al. |
| 4,531,920 A | | 7/1985 | Stricker |
| 6,142,841 A | | 11/2000 | Alexander, Jr. et al. |
| 6,230,642 B1 | | 5/2001 | McKenney et al. |
| 6,394,015 B1 | | 5/2002 | Gabriel |
| 6,612,256 B1 | | 9/2003 | Martin |
| 7,121,219 B1 | | 10/2006 | Stallings |
| 7,818,108 B2 | | 10/2010 | Bertazzoni |
| 8,136,467 B2 | | 3/2012 | Powell et al. |
| 2004/0229531 A1 | | 11/2004 | Driscoll et al. |
| 2006/0254494 A1 | | 11/2006 | Wingate |
| 2008/0178788 A1 | | 7/2008 | Straub |
| 2010/0031862 A1 | * | 2/2010 | Powell .................... B63B 59/02 |
| | | | 114/219 |
| 2014/0248089 A1 | | 9/2014 | Thompson et al. |
| 2016/0107727 A1 | | 4/2016 | Nachem |
| 2016/0187883 A1 | | 6/2016 | Tyers et al. |
| 2016/0274585 A1 | | 9/2016 | Karagiannis |
| 2016/0340005 A1 | * | 11/2016 | Arditi .................... B63B 59/02 |
| 2018/0050772 A1 | | 2/2018 | Koyano et al. |

FOREIGN PATENT DOCUMENTS

| | | |
|---|---|---|
| CN | 107045344 A | 8/2017 |
| EP | 2824528 A1 | 1/2015 |
| GB | 2374848 A | 10/2002 |
| GB | 2511731 A | 9/2014 |
| KR | 20150078763 A | 7/2015 |
| KR | 20170089716 A | 8/2017 |
| WO | WO9321063 A1 | 10/1993 |
| WO | 9822337 A1 | 5/1998 |
| WO | WO2006040785 A1 | 4/2006 |
| WO | 2010061994 A1 | 6/2010 |
| WO | 2016088033 A1 | 6/2016 |
| WO | 2017095235 A1 | 6/2017 |
| WO | WO2017167890 A1 | 10/2017 |

\* cited by examiner

SYSTEM FOR MANOEUVRING A BOAT

CROSS-REFERENCE TO RELATED APPLICATIONS

This application is a continuation-in-part of U.S. application Ser. No. 16/176,911, filed Oct. 31, 2018, which is a continuation-in-part of U.S. application Ser. No. 16/175,595, filed Oct. 30, 2018, and claims benefit of U.S. provisional patent application Ser. No. 62/582,165, filed Nov. 6, 2017, which are herein incorporated by reference in their entirety

TECHNICAL FIELD

The invention generally relates to a system for manoeuvring a boat, and more specifically to a system for manoeuvring a boat on water.

BACKGROUND

Generally, there are different systems for manoeuvring a boat known in the art. Certain boats can pose problems to operators of the boats during docking operation due to bulkier sizes of the boats. In order to assist manoeuvring of the boats, the boats have been provided with various kinds of propulsion devices including, bow thrusters, stern thrusters, and other auxiliary propulsion devices. Typically, the boat is propelled by drawing a stream of water through a channel at bottom of the boat and discharging the drawn stream of water from back of the boat. A typical boat structure has two major components including, a nozzle and a pump fluidly connected to the nozzle. Rotation of the nozzle deflects the exiting stream of water, thereby turning the boat either to the left direction or to the right direction of the boat. The boat generally includes a single pump that operates with valves. The single pump system tends to lose power due to wear and tear of the valves. In addition, the valves tend to become faulty before the useful period of the valves. The valves are also complicated and expensive to replace.

The manoeuvring of a boat in particular conditions, such as at restricted or confined space and on the water having obstacles generally requires a skilled operator. However, there are usually not enough good captains around, especially for smaller recreational boats. Accordingly, there remains a need for a system that is reliable and energy efficient that can manoeuvre the boat.

SUMMARY

It is an object of the invention to address and improve the aforementioned deficiencies in the prior art.

It is an object of the invention to facilitate automatic and accurate manoeuvring of a boat.

In one aspect of the invention, a plurality of water nozzles is provided on the boat. In an example, the plurality of water nozzles can be located at various different locations on the boat.

In another aspect of the invention, a plurality of pumps is operated by a power source of the boat. The plurality of pumps is primed continuously to reduce response time to control the plurality of pumps. Each of the plurality of pumps is connected to one water nozzle.

In a further aspect of the invention, a plurality of sensors monitors the motion of the boat. In an example, the plurality of sensors can be located anywhere on the boat. The plurality of sensors can track/monitor any movement of the boat on a real-time basis. The sensors can be implement similarly to parking radar on motor vehicles has been implemented. These sensors can be used when the boat is docked.

In a further aspect of the invention, an artificial intelligence module communicates with the plurality of water nozzles, the plurality of pumps, and/or the plurality of sensors. The artificial intelligence module keeps the boat in a stationary standstill or on a chosen course of motion. In addition, the artificial intelligence module controls the power source that is used to prime the plurality of pumps ejecting water through the nozzles.

A system for manoeuvring a boat in accordance with the invention is characterised in that,
 a plurality of water nozzles are provided on the boat;
 a plurality of pumps is operated by a power source of the boat, wherein the plurality of pumps is primed continuously to reduce response time to control the plurality of pumps and each of the plurality of pumps is connected to one water nozzle;
 a plurality of sensors configured to detect the state of motion of the boat; and
 an artificial intelligence module in communication with the plurality of water nozzles, the plurality of pumps, and/or the plurality of sensors, wherein the artificial intelligence module is configured to keep the boat in a stationary standstill or on a chosen course of motion.

By priming the pumps, we mean keeping electric power on in the pumps and/or the inflow and/or outflow of fluid present in the pumps. The artificial intelligence module could be replaced in some embodiments with a regular electronic control unit that does not deploy self-learning or machine learning techniques.

A software program product for manoeuvring a boat in accordance with the invention is characterised in that,
 a plurality of water nozzles are provided on the boat;
 a plurality of pumps is operated by a power source of the boat, wherein the plurality of pumps is primed continuously to reduce response time to control the plurality of pumps and each of the plurality of pumps is connected to one water nozzle;
 a plurality of sensors configured to detect the state of motion of the boat; and
 an artificial intelligence module in communication with the plurality of water nozzles, the plurality of pumps, and/or the plurality of sensors, wherein the artificial intelligence module is configured to keep the boat in a stationary standstill or on a chosen course of motion.

A method for manoeuvring a boat in accordance with the invention is characterised in that,
 providing a plurality of water nozzles on the boat;
 operating a plurality of pumps by a power source of the boat, wherein the plurality of pumps is primed continuously to reduce response time to control the plurality of pumps and each of the plurality of pumps is connected to one water nozzle;
 configuring a plurality of sensors to detect the state of motion of the boat; and
 configuring an artificial intelligence module to be in communication with the plurality of water nozzles, the plurality of pumps, and/or the plurality of sensors, wherein the artificial intelligence module keeps the boat in a stationary standstill or on a chosen course of motion.

In one aspect of the invention, the artificial intelligence module controls the plurality of pumps and the plurality of sensors, but the water nozzles are mere conduits for water ejected by the said pumps.

According to an aspect of the invention, the plurality of pumps is at least one centrifugal pump provided for each water nozzle of the plurality of water nozzles, and water nozzles are configured to eject water in one direction which is parallel to one axis of the boat, and configured to rotate the boat around another axis.

According to another aspect of the invention, the plurality of sensors may include, but not limited: a magnitude sensor, a gyro sensor, Three-Dimensional mapping sensor, a LIDAR sensor, a LASER sensor, an ultrasound sensor, a Three-Dimensional video sensor, a Two-Dimensional video sensor, satellite based location sensor, cellular or Wi-fi base station based location sensor, an acceleration sensor and/or a water pressure sensor.

According to yet another aspect of the invention, the artificial intelligence module is configured to compensate for motion of the boat when loaded and type of the boat, and wherein the artificial intelligence module is configured to control nozzle-specific ejection of water from the boat.

According to a further aspect of the invention, the system further comprises an interface operated by a user to control the position and direction of the boat in water.

According to a further aspect of the invention, the artificial intelligence module is configured to be in communication with a global positioning system (GPS) and an assisted global positioning system (AGPS), the global positioning system and the assisted global positioning system are configured to determine the stationary standstill or chosen course of motion of the boat, and the plurality of sensors are configured to identify obstacles created by pier structures and other naval obstacles, thereby precisely determining the stationary standstill or chosen course of motion of the boat. The GPS may include a location sensor to determine the stationary standstill or chosen course of motion of the boat.

According to a further aspect of the invention, the artificial intelligence module is configured to control the power source that is used to prime the plurality of water nozzles and to correct effects of waves on the motion of the boat based on an input received from water pressure sensors located at the bottom of the boat, or from acceleration sensors located anywhere in a boat.

According to a further aspect of the invention, the system further comprises a collision prevention system for a boat controlled via a computer, characterised in that,
  a plurality of fender bags disposed at a periphery of a body of the boat, and configured to operate between a first position and a second position based on filling of water therein, each fender bag is at an expanded condition in the second position and is at a contracted condition in the first position; and
  an elastic member attached to each of the plurality of fender bags, the elastic member configured to pull each fender bag to the first position from the second position thereof when water is drained from the fender bag.

According to a further aspect of the invention, the plurality of fender bags move to the second position from the first position based on an input received from multiple sensors and/or motion data.

According to a further aspect of the invention, the plurality of fender bags automatically retracts to the first position from the second position.

According to a further aspect of the invention, the plurality of fender bags is pulled into the first position based on pressure and weight of the water and tension of spring.

According to a further aspect of the invention, the system further comprises an automatic fastening system for a boat controlled via a computer, characterised in that,
  a plurality of fastening ropes integrated into a hull of the boat, the plurality of fastening ropes located on motorized rollers;
  a plurality of pumps configured to tighten the plurality of fastening ropes; and
  a control device configured to position the boat by guiding the plurality of fastening ropes, the control device is in electronic communication with the plurality of pumps to mechanically lock the plurality of fastening ropes.

According to a further aspect of the invention, the plurality of fastening ropes are tightened using pneumatic pressure produced by the plurality of pumps.

According to a further aspect of the invention, the control device is a joystick to position the boat by guiding the plurality of fastening ropes.

According to a further aspect of the invention, the cushioning of the plurality of fastening ropes is provided by shock absorber units of the automatic fastening system.

The invention has sizable advantages. The invention results in a system having a separate nozzle-based manoeuvring system with separate pumps for each nozzle. The pumps are primed continuously by a power source, and the artificial intelligence module keeps the boat stationary in the water even in the rough sea. The system is accurate and automatic, and is a silent propulsion system as compared to the single pump based system for manoeuvring the boat. Also, the inventive system is durable when compared to existing systems, as the overuse of valves is no longer a similar concern. In addition, owing to the presence of the automatic fender bags in the boat, the risk of colliding very destructively is diminished. Further, the more automatic fastening ropes aid in mechanically locking the boat to pier structures in the port or harbour.

In the best mode of the invention the main engine and the plurality of the pumps of the boat are controlled by the artificial intelligence (AI) module. The pumps connected to each nozzle are primed with power being on and water flow being present in the pump, so that the self-steering boat can react fast to any sensor input. Boat can have a user interface in the mobile communication device of the human operator. The mobile communication device, through the user interface, allows the captain to communicate one or more commands to the boat. Further, the AI boat's software may be an application in the mobile communication device, capable of receiving commands from the operator to control the manoeuvring of the boat based on the received commands. In the best mode the mobile communication device, in particular the application of the mobile communication device, receives of the nearest port and requirement of the AI boat to arrive at this port, by user input and GPS or otherwise. On receipt of such input, the application may provide a notification to the captain, which may be displayed on the user interface. In order to reach such port, the captain may manoeuvre the boat in manual mode or the satellite navigation mode. The application may include options to remember a path of travel of the boat, to vary the speed of travel of the boat, and to select a direction to traverse for reaching the desired port. In an embodiment, the operator may choose to select the manual mode for reaching the port. Further, while approaching the port the plurality of fender bags can be deployed manually or automatically.

In the manual mode, the operator can manually deploy the plurality of fender bags upon identifying naval obstacles to prevent the boat from colliding with other boats near the port. Also, the plurality of fender bags can be deployed automatically by the multiple sensors to prevent the boat from colliding destructively with other boats near the port. Further, upon reaching the port, the AI module controls the boat to be docked. Further the boat can retrace the path traversed by the boat when it leaves the port, as the AI boat is capable of remembering the travel path.

Some of the embodiments are described in the dependent claims.

DETAILED DESCRIPTION OF EMBODIMENTS

The present disclosure provides a communication system, method, and a software program product for manoeuvring a boat.

Figure 1:
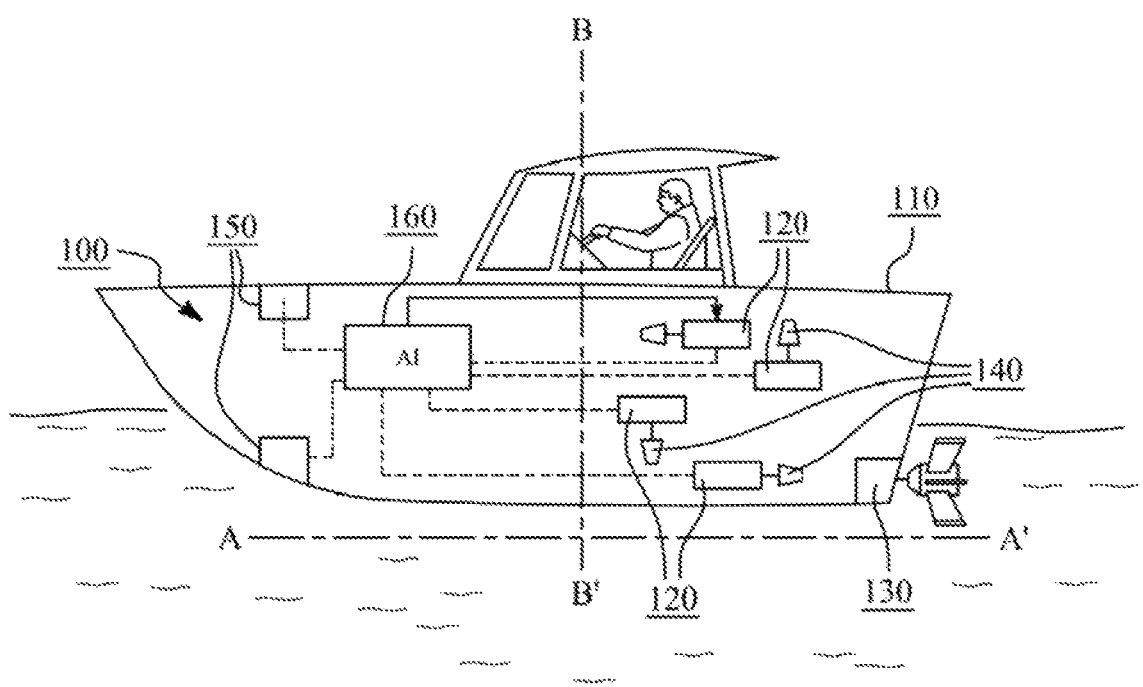
FIG. 1 demonstrates an embodiment 10 of a system for manoeuvring a boat, in accordance with the invention as a pictorial diagram.

FIG. 1 demonstrates an embodiment 10 of a system 100, in accordance with the invention as a pictorial diagram. A boat 110 may be some other watercraft, such as a vessel, a ship, a yacht, a cruiser, or any other watercraft. The boat 110 may be any of a manual, an automated or a semi-automated machine. In an example, the boat 110 may be designed to float, plane, work or travel on a water surface or a waterbody. The boat 110 includes the system 100 for manoeuvring the boat 110. The system 100 can operate in a port or in the high seas. The system 100 includes a plurality of pumps 120. In an operating state of the boat 110, the plurality of pumps 120 is operated by a power source 130. The power source 130 generates electricity that is used to operate the plurality of pumps 120. In an example, the power source 130 may be a battery or a generator or a solar panel provided on the boat 110, or a battery and a petrol engine which battery is charged by the petrol engine. In some embodiments the boat is electrically charged only, in which case the power source 130 is predominantly a battery.

In an example, the priming of the plurality of pumps 120 is defined as the electric power on in the plurality of pumps 120, and inflow or outflow of liquid ongoing in the plurality of pumps 120. In an embodiment, the plurality of pumps 120 is primed continuously to reduce response time to control the plurality of pumps 120. A plurality of water nozzles 140 are provided on the boat 110. The power of the plurality of pumps connected to water nozzles 140 can be tuned continuously. In an alternative example, a plurality of rotors can also be provided on the boat 110 to replace or complement the pump+nozzle devices. Specifically, the plurality of rotors can be provided as alternative to the plurality of water nozzles 140. In an example, the plurality of water nozzles 140 is disabled if the plurality of pumps 120 is in operating state. The plurality of pumps 120 is a centrifugal pump connected to each nozzle of the plurality of water nozzles 140 of the system 100. Each pump of the plurality of pumps 120 is connected to one water nozzle 140. Owing to the connection between the plurality of pumps 120 and the plurality of water nozzles 140, the plurality of pumps 120 reduces the need for tubes in the boat 110, thereby making the response time shorter during manoeuvring of the boat 110.

The plurality of water nozzles 140 are configured to eject water in a direction parallel to an axis A-A' of the boat 110. Further, the plurality of water nozzles 140 causes rotation of the boat 110 around another axis B-B'. The rotation of the boat 110 is determined by a plurality of sensors 150 disposed in the boat 110. In the illustrated example, the plurality of sensors 150 is disposed at a front portion of the boat 110. However, it is being understood that the plurality of sensors 150 can be located anywhere on the boat 110.

The plurality of sensors 150 is further configured to monitor the motion of the boat 110. The plurality of sensors 150 can identify obstacles that may be created by pier structures in a port. The term "port" as used herein refers to a location on a coast or shore containing one or more harbors where boats can dock and transfer passengers or animals or cargo to or from a land surface. In an example, the plurality of sensors 150 may be any one of, a magnitude sensor, a gyro sensor, Three-Dimensional mapping sensor, a LIDAR sensor, a LASER sensor, an ultrasound sensor, a Three-Dimensional video sensor, a Two-Dimensional video sensor, and a water pressure sensor.

The system 100 further includes an artificial intelligence module 160. The artificial intelligence module 160 is a self-learning computer that uses multiple iterations/reference data sets to determine and classify a particular observed data set. The artificial intelligence module 160 is in communication with the plurality of pumps 120, the plurality of water nozzles 140, and/or the plurality of sensors 150. In an example, connection between the plurality of water nozzles 140 and the artificial intelligence module 160 may not be required when the plurality of pumps 120 is in operating state. The artificial intelligence module 160 is configured to receive inputs from the plurality of pumps 120, the plurality of water nozzles 140, and the plurality of sensors 150. The artificial intelligence module 160 can control the plurality of water nozzles 140 to navigate the boat 110. In an embodiment, the artificial intelligence module 160 is disposed inside the boat 110. It is to be understood that the artificial intelligence module 160 may be located outside the boat 110 and may be configured to be in communication with a controller (not shown) of the boat 110. The communication between the artificial intelligence module 160 and the plurality of pumps 120, the plurality of water nozzles 140, and the plurality of sensors 150 may be established through a wireless communication. In an example, the artificial intelligence module 160 may be connected to a cloud server network through the wireless communication connection. In an example, the artificial intelligence module 160 can be embodied as a control unit. For instance, the control unit may include programs and/or algorithms capable of executing one or more functions described later with respect to the artificial intelligence module 160. When the artificial intelligence module 160 is embodied as the control unit, the control unit may be capable of being connected to the cloud server network through the wireless communication. Further, in some examples, the control unit may be operated with a cell phone or a tablet such as an iPad through the wireless communication to navigate the boat 110. Further, the control unit can include a graphics processing unit (GPU) to aid functioning of the control unit. The control unit may also control propulsion devices such as the bow/stern thruster. The GPU may reside either on the boat, or on the cloud server or in a mobile device used to control the boat, in accordance with the invention.

Any features of embodiment 10 may be readily combined or permuted with any of the other embodiments 20, 30, 40, 50, 60, 70, 80, 81, 90, 91, 92, and/or 93 in accordance with the invention.

Figure 2:
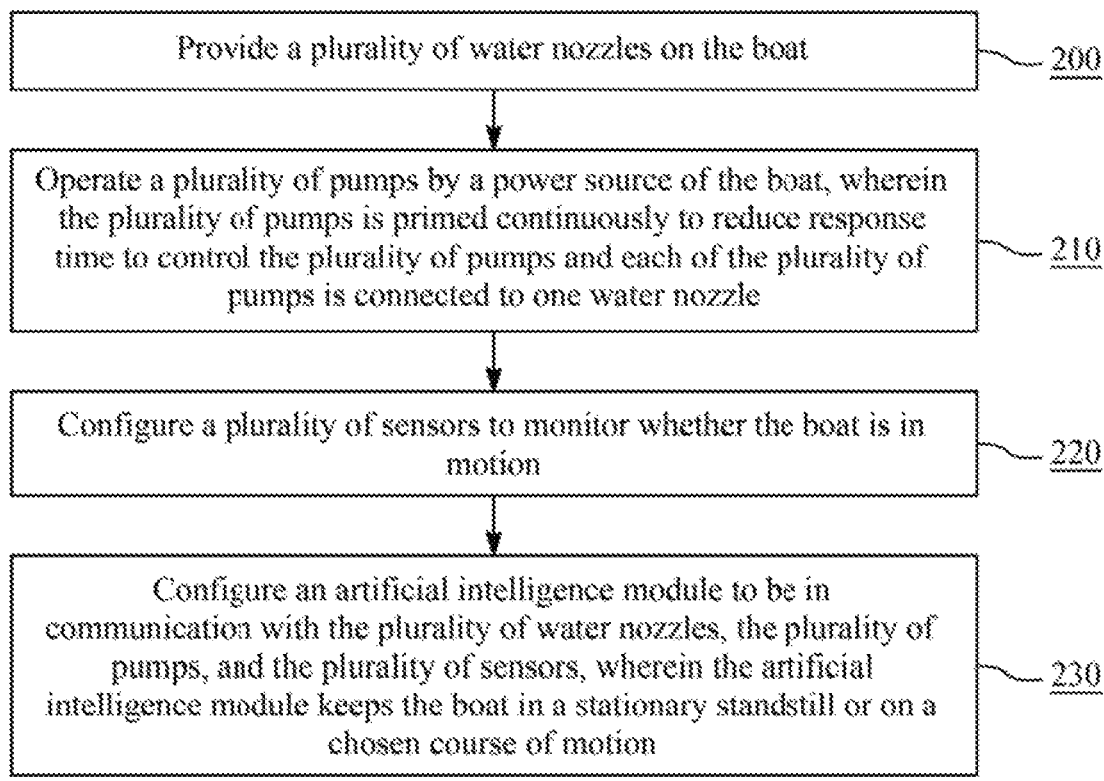
FIG. 2 demonstrates an embodiment 20 of a method for manoeuvring the boat, in accordance with the invention as a flow diagram.

FIG. 2 demonstrates an embodiment 20 of a method for manoeuvring the boat 110, in accordance with the invention as a flow diagram. The method could be implemented in a system identical or similar to embodiment 10 in FIG. 1 for example, as discussed in the other parts of the description. An end-user of the method could use a user interface identical or similar to that disclosed with embodiments 30, 40 and 60 in FIG. 3, FIG. 4 and FIG. 6.

In phase 200, the plurality of water nozzles 140 are provided on the boat 110. In an example, the plurality of water nozzles 140 can be located at different locations on the boat. The plurality of water nozzles 140 are configured to fluidly couple with the plurality of pumps 120 for operation of the plurality of water nozzles 140 thereof.

In phase 210, the power source 130 of the boat 110 is configured to operate the plurality of pumps 120. The plurality of pumps 120 is primed continuously to reduce response time to control the plurality of pumps 120. Further, each of the plurality of pumps 120 is connected to one water nozzle 140.

In phase 220, the plurality of sensors 150 is configured to monitor motion of the boat 110. The plurality of sensors 150 can track/monitor any movement, including rotation about the axis B-B' or travel path of the boat 110 on a real-time basis.

In phase 230, the artificial intelligence module 160 is configured to be in communication with the plurality of pumps 120, the plurality of water nozzles 140, and the plurality of sensors 150. The artificial intelligence module 160 is configured to keep the boat 110 in a stationary standstill or on a chosen course of motion by controlling operations of the plurality of pumps 120, the plurality of water nozzles 140 through the power source 130.

Any features of embodiment 20 may be readily combined or permuted with any of the other embodiments 10, 30, 40, 50, 60, 70, 80, 81, 90, 91, 92, and/or 93 in accordance with the invention.

Figure 3:
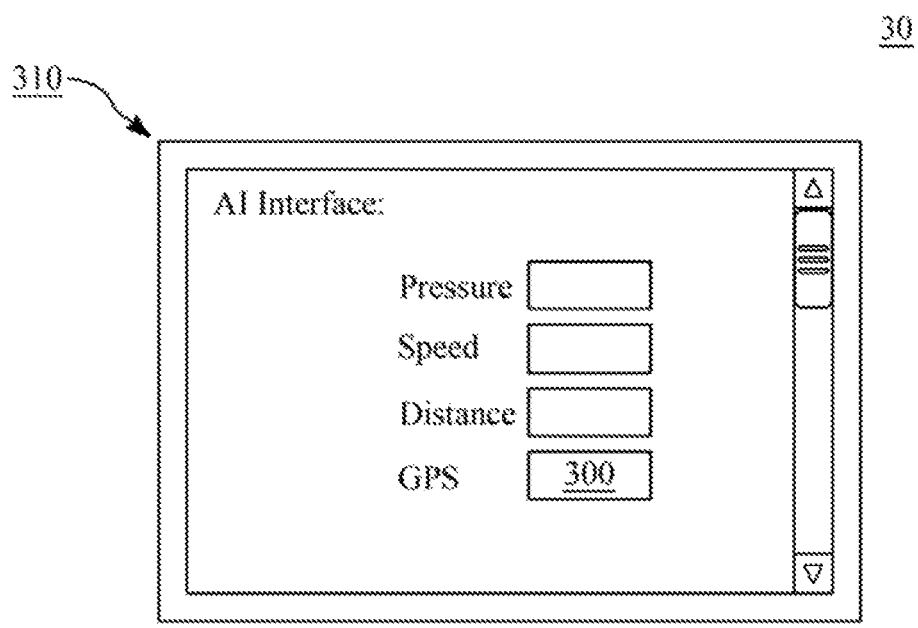
FIG. 3 demonstrates an embodiment 30 of a software interface of the artificial intelligence module, in accordance with the invention as a screen shot diagram.

FIG. 3 demonstrates an embodiment 30 of a software interface of the artificial intelligence module 160, in accordance with the invention as a screen shot diagram. As the artificial intelligence module 160 is in communication with the plurality of pumps 120 and the plurality of water nozzles 140, the artificial intelligence module 160 is configured to determine pressure of the water at each pump 120 and/or each water nozzle 140. The determined pressure of water at each pump 120 and each water nozzle 140 is communicated and displayed on the software interface. The artificial intelligence module 160 is configured to determine the speed at which the boat 110 is travelling and also the distance that needs to be traversed by the boat 110. In addition to determining the speed and distance that needs to be travelled by the boat 110, the artificial intelligence module 160 is capable of providing a predefined speed and direction of travel to the operator during the course of motion of the boat 110. The determined speed, distance, direction of travel is communicated and displayed on the software interface.

Further, owing to the communication between the artificial intelligence module 160 and a global positioning system 300, the artificial intelligence module 160 determines the location of the boat 110 in some embodiments. More particularly, the artificial intelligence module 160 receives signals from the global positioning system 300 indicative of the location of the boat 110. The location of the boat 110 can be stored in a memory of the artificial intelligence module 160. The determined location of the boat 110 is communicated and displayed on the software interface. Further, in an example, the location of the boat 110 can be determined using Wi-Fi or cellular triangulation or recognition of a route/place from a map or from an image taken by a camera. The software interface can be used to monitor the parameters for operating the boat 110 on a real-time basis. The operator can access the details of the operational parameters for operating the boat 110. In an example, the software interface may be disposed at a dashboard of the boat 110. In another example, the software interface may be configured on a portable device including, but not limited to, a Personal Digital Assistant (PDA) device, a tablet, a smart phone, a laptop, a mobile handheld device, or any other display device. In another example, the software interface may be provided with a warning indicators for providing visual warning to the operator in cases if the operational parameters so warrant.

Any features of embodiment 30 may be readily combined or permuted with any of the other embodiments 10, 20, 40, 50, 60, 70, 80, 81, 90, 91, 92, and/or 93 in accordance with the invention.

Figure 4:
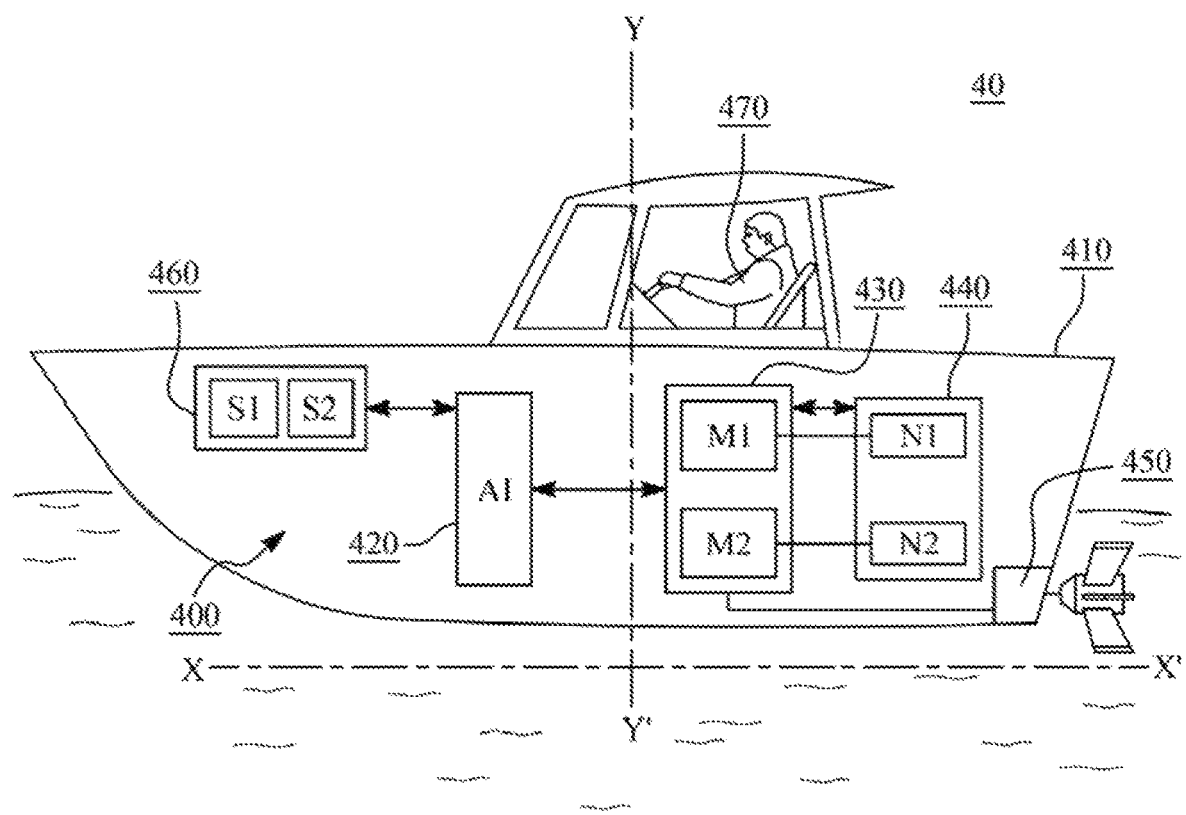
FIG. 4 demonstrates an embodiment 40 of a more elaborate system for manoeuvring the boat, in accordance with the invention as a pictorial diagram.

FIG. 4 demonstrates an embodiment 40 of the system 400 for manoeuvring the boat 410, in accordance with the invention as a pictorial diagram. The system 400 includes a plurality of pumps 430 having two pumps (M1, M2) and a plurality of water nozzles 440. It is to be understood that for the illustration purpose, the FIG. 4 is incorporated with two pumps (M1, M2) and two water nozzles (N1, N2) and it is not meant to be limiting the scope of the invention. In an operating state of the boat 410, the plurality of pumps 430 is operated by a power source 450. In an embodiment, the plurality of pumps 430 is primed continuously to reduce response time to control the operation of the plurality of pumps 430. Each pump of the plurality of pumps 430 is connected to one water nozzle 440 of the system 400. In the illustrated figure, the pump M1 is configured to be fluidly connected with the water nozzle N1 and the pump M2 is configured to be fluidly connected with the water nozzle N2.

The plurality of pumps 430 and the plurality of water nozzles 440 are provided at a hull portion (not shown) of the boat 410. However, it is to be understood that the plurality of pumps 430 and the plurality of water nozzles 440 may be located at any other different locations on the boat 410. For the sake of convenience in description, the plurality of water nozzles 440 will be hereinafter referred to as "the plurality of water nozzles 440". The plurality of water nozzles 440 are configured to eject water in a direction parallel to an axis X-X' of the boat 110. Further, the plurality of water nozzles 440 can rotate the boat 410 around another axis Y-Y'. The plurality of water nozzles 440 causes rotation of the boat 410 with respect to one axis Y-Y'. The system 400 includes a plurality of sensors 460 having two sensors (S1, S2). It is to be understood that for the illustration purpose, the FIG. 4 is incorporated with two sensors (S1, S2) and it is not meant to be limiting the scope of the invention. The rotation of the boat 410 is determined by the plurality of sensors 460 disposed on the boat 410. In an embodiment, the plurality of sensors 460 is disposed at front portion of the boat 410. However, it is being understood that the plurality of sensors 460 can be located anywhere on the boat 410.

In some embodiments the nozzles turn to facilitate navigation and movement of the boat in a certain direction. In some embodiments the navigation and movement of the boat is achieved by powering different pumps in different locations of the boat, sometimes on any side, back or front of the boat. Sometimes these techniques are used in a mix.

In operation, water with pressure 'P1' is fed into an inlet (not shown) of each of the plurality of pumps 430. Each pump 430 increases pressure of the water from 'P1' to 'P2'. Water with pressure 'P2' is expelled into an inlet of each water nozzle 440 through an outlet of the plurality of pumps 430. Further, owing to the decreasing cross-sectional area of the plurality of water nozzles 440, velocity of the water increases and is expelled from an outlet of the plurality of water nozzles 440, thereby causing movement of the boat 410 about the axis X-X'.

The plurality of sensors 460 is further configured to monitor the motion of the boat 410. The plurality of sensors 460 can identify obstacles that may be created by pier structures in a port. The term "port" as used herein refers to a location on a coast or shore containing one or more harbors where boats can dock and transfer passenger's or animals or cargo to or from a land surface. In an example, the plurality of sensors 460 may be any one of, a magnitude sensor, a gyro sensor, Three-Dimensional mapping sensor, a LIDAR sensor, a LASER sensor, an ultrasound sensor, a Three-Dimensional video sensor, a Two-Dimensional video sensor, an acceleration sensor and a water pressure sensor.

The system 400 further includes an artificial intelligence module 420. The artificial intelligence module 420 is in communication with the plurality of water nozzles 440, the plurality of pumps 430, and the plurality of sensors 460. The artificial intelligence module 420 is configured to receive inputs from the plurality of water nozzles 440, the plurality of pumps 430 and/or the plurality of sensors 460. In the illustrated FIG. 1, the artificial intelligence module 420 is disposed inside the boat 410. It is to be understood that the artificial intelligence module 420 may be located outside the boat 410 and may be configured to be in communication with a controller (not shown) of the boat 410. The communication between the artificial intelligence module 420 and the plurality of water nozzles 440, the plurality of pumps 430 and/or the plurality of sensors 460 may be established through a wireless communication network or with wires.

The artificial intelligence module 420 compensates for motion of the boat 410, when the boat 410 is loaded and depending on the type of the boat. The artificial intelligence module 420 also controls nozzle-specific ejection of water from the boat 410. Further, the artificial intelligence module 420 is in communication with a global positioning system (GPS) 300 (as shown in FIG. 3) and an assisted global positioning system (AGPS). The GPS 300 may include a location sensor to determine the stationary standstill or chosen course of motion of the boat 110. The global positioning system 300 and the assisted global positioning system determines the stationary standstill or chosen course of motion of the boat 410. The plurality of sensors 460 identifies obstacles created by pier structures, thereby precisely determining the stationary standstill or chosen course of motion of the boat 410. In addition, the artificial intelligence module 420 controls the power source 450 that is used to prime the plurality pumps in control of the water nozzles 440 and corrects effects of waves on the motion of the boat 410 based on an input received from water pressure sensors or acceleration sensors located at the bottom of the boat 410, or from the acceleration sensors located anywhere in the boat 410. The system 400 further includes an interface 310 (as shown in FIG. 3). The interface 310 is operated by a human operator 470 to control the position and direction of the boat 410 on the water surface.

Any features of embodiment 40 may be readily combined or permuted with any of the other embodiments 10, 20, 30, 50, 60, 70, 80, 81, 90, 91, 92, and/or 93 in accordance with the invention.

Figure 5:
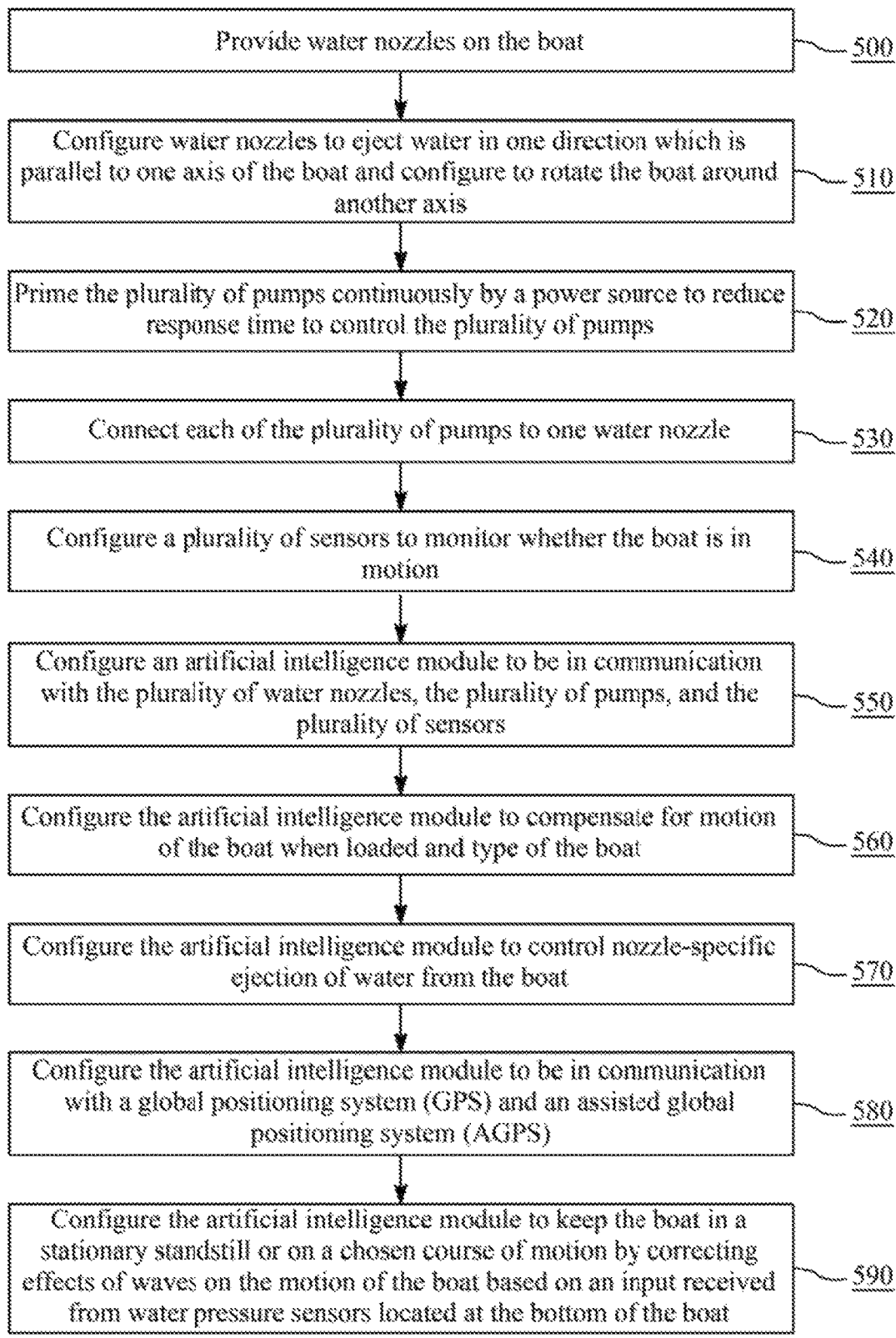
FIG. 5 demonstrates an embodiment 50 of a more elaborate method of operating the boat having the artificial intelligence module, in accordance with the invention as a flow diagram.

FIG. 5 demonstrates an embodiment 50 of a method for manoeuvring the boat 110, in accordance with the invention as a flow diagram. The method could be implemented in a system identical or similar to embodiments 10, 30, 40, and 60 in FIGS. 1, 3, 4, and 6 for example, as discussed in the other parts of the description. An end-user of the method could use a user interface identical or similar to that disclosed with embodiments 30, 40 and 60 in FIGS. 3, 4 and 6.

For the sake of convenience in description, reference numerals of the boat, the plurality of pumps, the plurality of water nozzles, the power source, and the plurality of sensors are referred with the reference numerals of FIG. 1.

In phase 500, the boat 110 is provided with the plurality of water nozzles 140. In an example, the plurality of water nozzles 140 can be located at various different locations on the boat 110.

In phase 510, the plurality of water nozzles 140 are configured to eject water in one direction which is parallel to the axis A-A' of the boat 110. Further, the pluralities of water nozzles 140 rotate the boat 110 around the axis B-B'. In an example, the pluralities of water nozzles 140 cause rotation of the boat 110 with respect to one axis.

In phase 520, the power source 130 of the boat 110 operates the plurality of pumps 120. The plurality of pumps 120 is primed continuously to reduce response time to control the plurality of pumps 120.

In phase 530, each of the plurality of pumps 130 is connected to one water nozzle 120.

In phase 540, the plurality of sensors 150 is configured to monitor whether the boat 110 is in motion. The plurality of sensors 150 can identify obstacles created by pier structures in a port.

In phase 550, the artificial intelligence module 160 is configured to be in communication with the plurality of pumps 120, the plurality of water nozzles 140, and the plurality of sensors 150.

In phase 560, the artificial intelligence module 160 is configured to compensate for motion of the boat 110 when loaded and type of the boat 110.

In phase 570, the artificial intelligence module 160 is configured to control nozzle-specific ejection of water from the boat 110.

In phase 580, the artificial intelligence module 160 is configured to be in communication with the global positioning system (GPS) 300 and an assisted global positioning system (AGPS). The global positioning system (GPS) 300 and the assisted global positioning system (AGPS) are configured to determine the stationary standstill position or chosen course of motion of the boat 110.

In phase 590, the artificial intelligence module 160 keeps the boat in a stationary standstill or on a chosen course of motion. More particularly, the artificial intelligence module 160 is configured to keep the boat in a stationary standstill or on a chosen course of motion by correcting effects of waves on the motion of the boat 110 based on an input received from water pressure sensors located at the bottom or sides of the boat 110, or from acceleration sensors located anywhere in the boat 110.

Any features of embodiment 50 may be readily combined or permuted with any of the other embodiments 10, 20, 30, 40, 60, 70, 80, 81, 90, 91, 92, and/or 93 in accordance with the invention.

Figure 6:
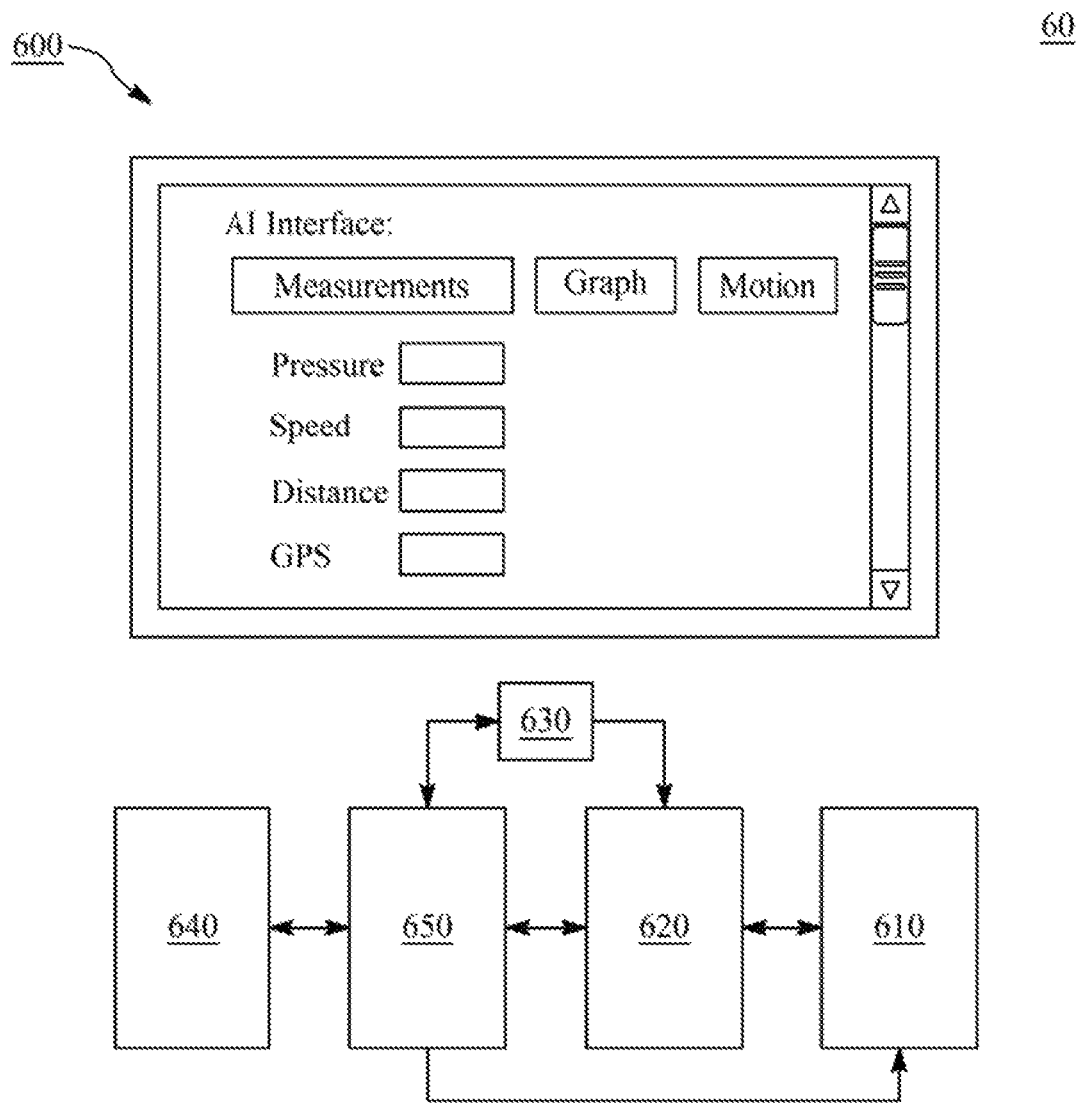
FIG. 6 demonstrates an embodiment 60 of a more elaborate software user interface, in accordance with the invention as a screen shot diagram.

FIG. 6 demonstrates an embodiment 60 of a more elaborate software program product 600 for manoeuvring the boat 110, in accordance with the invention as a screen shot diagram. For the sake of convenience in description, reference numeral of the boat is referred with respect to the reference numeral of the boat of FIG. 1.

The software program product 600 operates the plurality of water nozzles 610 provided on the boat 110. The plurality of water nozzles 610 can be located at various different locations on the boat 110. The plurality of water nozzles 610 are configured to eject water in one direction which is parallel to the axis A-A' (as shown in FIG. 1) of the boat 110. Further, the plurality of water nozzles 610 rotates the boat 110 around the axis B-B' (as shown in FIG. 1). The software program product 600 operates the plurality of pumps 620 that is operated by a power source 630 in an operating state of the boat 110. The plurality of pumps 620 is primed continuously to reduce response time to control the plurality of pumps 620 and each of the plurality of pumps 620 is connected to one water nozzle 610. In an example, the plurality of pumps 620 is a centrifugal pump. The software program product 600 operates the plurality of sensors 640 that is configured to monitor the motion of the boat 110. The plurality of sensors 640 may involve any of a magnitude sensor, a gyro sensor, Three-Dimensional mapping sensor, a LIDAR sensor, a LASER sensor an ultrasound sensor, a Three-Dimensional video sensor, a Two-Dimensional video sensor, an accelerations sensor and a water pressure sensor. The software program product 600 operates an artificial intelligence module 650 that is in communication with the plurality of water nozzles 610, the plurality of pumps 620, and the plurality of sensors 640. The artificial intelligence module 650 is configured to keep the boat 110 in a stationary standstill or on a chosen course of motion. The artificial intelligence module 650 is configured to control the power source 630 that is used to prime the plurality of water nozzles 610 and correct effects of waves on the motion of the boat 110 based on an input received from water pressure sensors located at the bottom of the boat 110, or from acceleration sensors located anywhere in the boat 110.

Any features of embodiment 60 may be readily combined or permuted with any of the other embodiments 10, 20, 30, 40, 50, 70, 80, 81, 90, 91, 92, and/or 93 in accordance with the invention.

Figure 7:
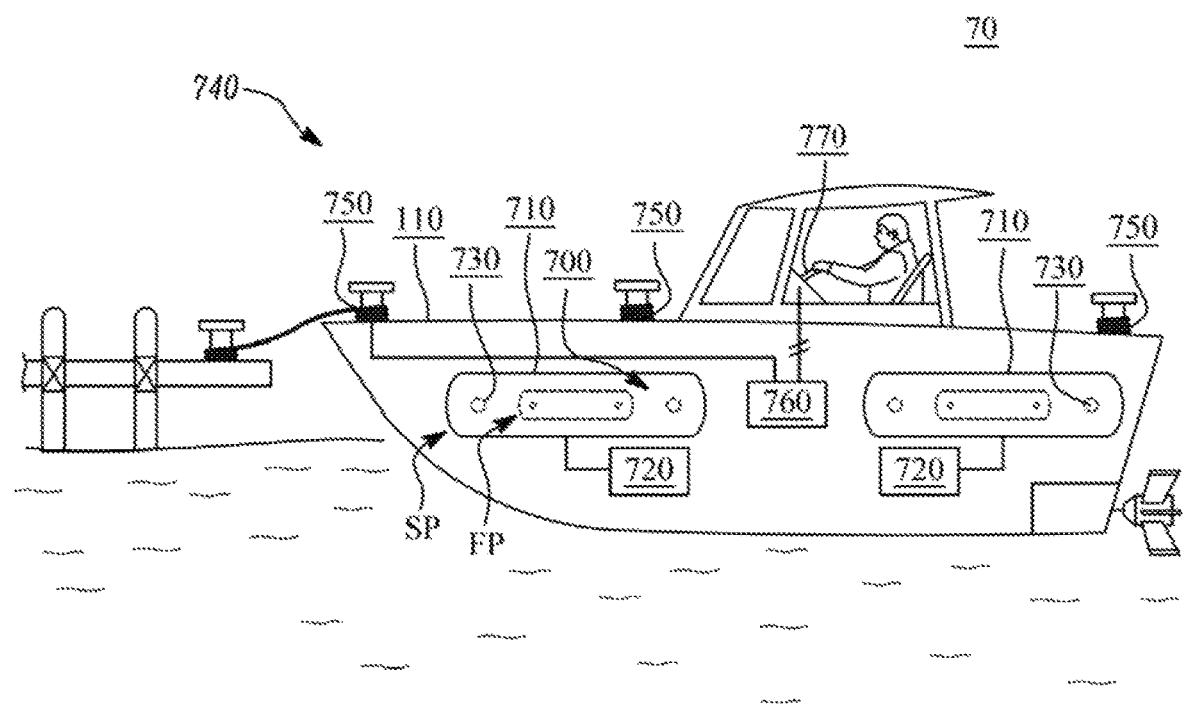
FIG. 7 demonstrates an embodiment 70 of a more elaborate system for manoeuvring the boat having the artificial intelligence module, in accordance with the invention as a pictorial diagram.

FIG. 7 demonstrates an embodiment 70 of a more elaborate system 100 for manoeuvring the boat 110 having the artificial intelligence module 160, in accordance with the invention as a pictorial diagram. For the sake of convenience in description, reference numeral of the boat is referred with respect to the reference numeral of the boat of FIG. 1.

The system 100 further comprises a collision prevention system 700 for the boat 110 controlled via a computer. The collision prevention system 700 includes a plurality of fender bags 710 disposed at a periphery of a body of the boat 110. In an example, the plurality of fender bags 710 can be of varying diameter and length. In an embodiment, the plurality of fender bags 710 is a fillable non-elastic member and can be located at various different positions on the periphery of the boat 110. In some embodiments the fender is a fillable elastic member. The plurality of fender bags 710 acts as a bumper that is used to absorb the kinetic energy of the boat berthing against quay wall or other boats and prevents damage to the boat 110 and berthing structures. In an example, the plurality of fender bags 710 is typically manufactured out of rubber, foam elastomer or plastic. The selection of the plurality of fender bags 710 for the boat 110 depends on many variables, including dimensions and displacement of the boat, maximum allowable stand-off, berthing structure, tidal variations and other berth-specific conditions.

The plurality of fender bags 710 is configured to operate between a first position 'FP' and a second position 'SP' based on filling of water therein. More particularly, the plurality of fender bags 710 move to the second position 'SP' from the first position 'FP' based on an input received from a plurality of sensors 720 of the system 100. In addition, the movement of the plurality of fender bags 710 from the second position 'SP' to the first position 'FP' can be based on motion data of the boat 110 obtained by the artificial intelligence module 160 of the system 100. Upon receipt of signals from the plurality of sensors 720 and the obtained motion data, the plurality of fender bags 710 automatically retract to the first position 'FP' from the second position 'SP'. In particular, the plurality of fender bags 710 is pulled into the first position 'FP' based on pressure and weight of water in each fender bag 710. Each fender bag 710 is at an expanded condition in the second position 'SP' and is at a contracted condition in the first position 'FP'.

The collision prevention system 700 further includes an elastic member 730 attached to each of the plurality of fender bags 710. The elastic member 730 is configured to pull each fender bag 710 to the first position 'FP' from the second position 'SP' thereof when water is drained from each fender bag 710. In particular, the plurality of fender bags 710 is pulled into the first position 'FP' based on tension of the elastic member 730. In an example, the elastic member 730 can be a spring.

The system 100 further includes an automatic fastening system 740 for the boat 110 controlled via the computer. The automatic fastening system 740 includes a plurality of fastening ropes 750 integrated into a hull of the boat 110. The plurality of fastening ropes 750 is located on motorized rollers (not shown) of the boat 110. In an example, the plurality of fastening ropes 750 can be located at various different locations on the boat 110. The cushioning effect to the plurality of fastening ropes 750 is provided by shock absorber units of the automatic fastening system 740. The automatic fastening system 740 further includes a plurality of pumps 760 is configured to tighten the plurality of fastening ropes 750. Further, the plurality of fastening ropes 750 is tightened using pneumatic pressure produced by the plurality of pumps 760. The automatic fastening system 740 further includes a control device 770 configured to position the boat 110 by guiding the plurality of fastening ropes 750. The control device 770 is in electronic communication with the plurality of pumps 760 to mechanically lock the plurality of fastening ropes 750. In an example, the control device 770 is joystick that is used to position the boat by guiding the plurality of fastening ropes 750. Upon reaching the port, the plurality of pumps 760 tightens the plurality of fastening ropes 750 and the control device 770 locks the plurality of fastening ropes 750 to pier structures 780 in the port, thereby docking the boat 110 without the risk of drifting or colliding with other boats in the port.

Any features of embodiment 70 may be readily combined or permuted with any of the other embodiments 10, 20, 30, 40, 50, 60, 80, 81, 90, 91, 92, and/or 93 in accordance with the invention.

Figure 8A:
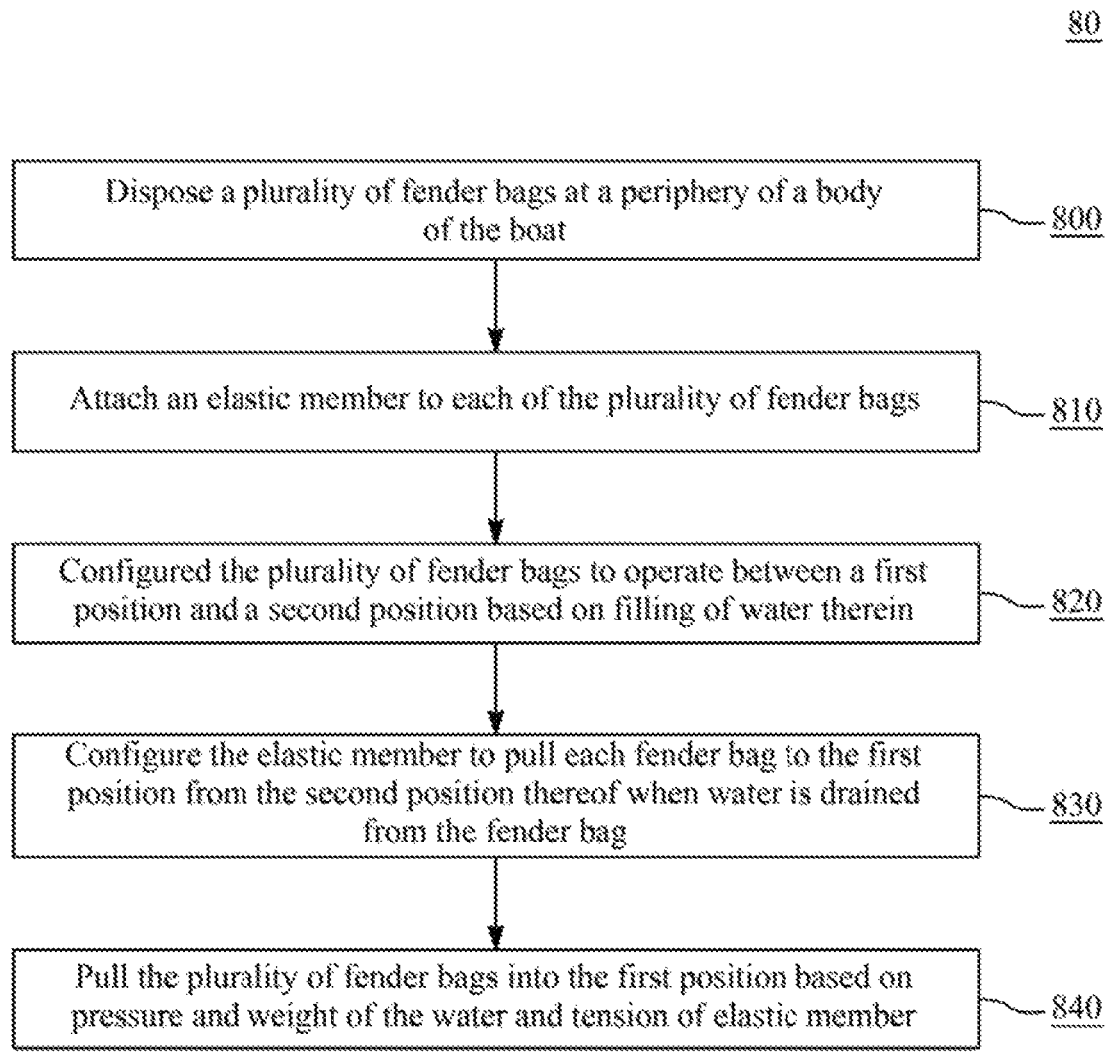
FIG. 8A demonstrates an embodiment 80 of a more elaborate method of prevention of collision of the boat, in accordance with the invention as a flow diagram.

FIG. 8A demonstrates an embodiment 80 of a method for preventing collision for the boat 110 controlled via a computer, in accordance with the invention as a flow diagram. The method could be implemented in a system identical or similar to embodiment 70 in FIG. 7 for example, as discussed in the other parts of the description. An end-user of the method could use a user interface identical or similar to that disclosed with embodiment 70 in FIG. 7. For the sake of convenience in description, reference numeral of the boat is referred with respect to the reference numeral of the boat of FIG. 1.

In phase 800, the plurality of fender bags 710 is disposed at a periphery of the body of the boat 110. In an example, the plurality of fender bags 710 can be located at various different positions on the periphery of the boat 110.

In phase 810, the elastic member 730 is attached to each of the plurality of fender bags 710.

In phase 820, the plurality of fender bags 710 is configured to operate between the first position 'FP' and the second position 'SP' based on filling of water. In an example, the plurality of fender bags 710 is at an expanded condition in the second position 'SP' and is at a contracted condition in the first position 'FP'.

In phase 830, the elastic member 730 is configured to pull each fender bag of the plurality of fender bags 710 to the first position 'FP' from the second position 'SP' when water is drained from the plurality of fender bags 710.

In phase 840, the plurality of fender bags 710 is pulled into the first position 'FP' based on pressure and weight of the water and tension of the elastic member 730.

Any features of embodiment 80 may be readily combined or permuted with any of the other embodiments 10, 20, 30, 40, 50, 60, 70, 81, 90, 91, 92, and/or 93 in accordance with the invention.

Figure 8B:
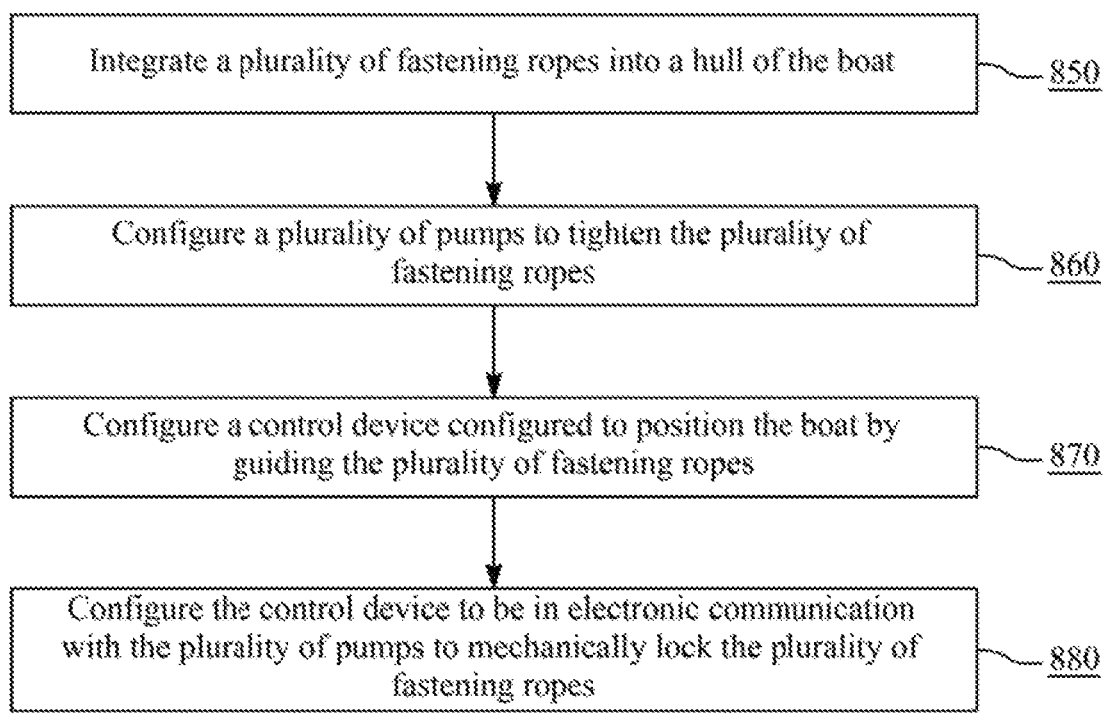
FIG. 8B demonstrates an embodiment 80 of a more elaborate method for a boat having an automatic fastening system, in accordance with the invention as a flow diagram.

FIG. 8B demonstrates an embodiment 80 of a method of automatic fastening system 740 for the boat 110 controlled via a computer, in accordance with the invention as a flow diagram. The method could be implemented in a system identical or similar to embodiment 70 in FIG. 7 for example, as discussed in the other parts of the description. An end-user of the method could use a user interface identical or similar to that disclosed with embodiment 70 in FIG. 7. For the sake of convenience in description, reference numerals of the boat in FIG. 1 are used.

In phase 850, the plurality of fastening ropes 750 is integrated into a hull of the boat 110.

In phase 860, the plurality of pumps 760 is configured to tighten the plurality of fastening ropes 750. In particular, the plurality of fastening ropes 750 is tightened using pneumatic pressure produced by the plurality of pumps 760.

In phase 870, the control device 770 is configured to position the boat 110 by guiding the plurality of fastening ropes 750.

In phase 880, the control device 770 is configured to be in electronic communication with the plurality of pumps 760 to mechanically lock the plurality of fastening ropes 750.

Any features of embodiment 81 may be readily combined or permuted with any of the other embodiments 10, 30, 40, 50, 60, 70, 80, 90, 91, 92, and/or 93 in accordance with the invention.

Figure 9:
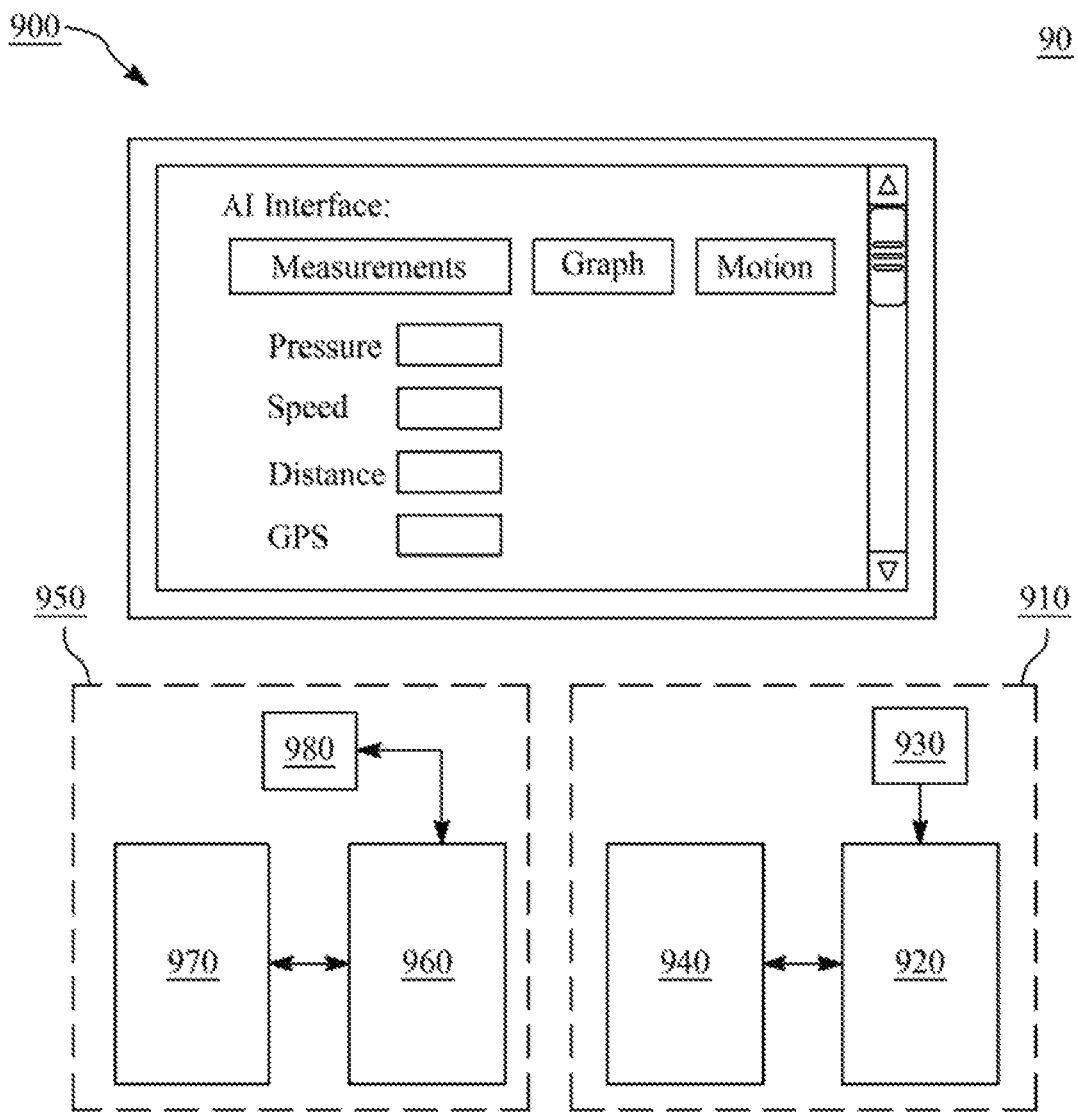
FIG. 9 demonstrates an embodiment 90 of a more elaborate software user interface, in accordance with the invention as a screen shot diagram.

FIG. 9 demonstrates an embodiment 90 of a more elaborate software program product 900 of the boat 110, in accordance with the invention as a screen shot diagram. The reference numerals of the boat in FIG. 1 are used.

The software program product 900 comprises a collision prevention system 910. The software program product 900 operates a plurality of fender bags 920 disposed at a periphery of a body of the boat 110. The software program product 900 operates the plurality of fender bags 920 between the first position 'FP' (as shown in FIG. 7) and the second position 'SP' (as shown in FIG. 7) based on filling of water therein. More particularly, the plurality of fender bags 920 move to the second position 'SP' from the first position 'FP' based on an input received from a plurality of sensors 930. In addition, the movement of the plurality of fender bags 920 from the second position 'SP' to the first position 'FP' can be based on motion data of the boat 110 obtained by the artificial intelligence module 160. Upon receipt of signals from the plurality of sensors 930 and the obtained motion data, the plurality of fender bags 920 automatically retract to the first position 'FP' from the second position 'SP'. In particular, the plurality of fender bags 920 is pulled into the first position 'FP' based on pressure and weight of water in each fender bag 710. Each fender bag 920 is at an expanded condition in the second position 'SP' and is at a contracted condition in the first position 'FP'.

The software program product operates the elastic member 940 that is attached to each of the plurality of fender bags 920. The elastic member 940 is configured to pull each fender bag 920 to the first position 'FP' from the second position 'SP' thereof when water is drained from each fender bag 710. In particular, the plurality of fender bags 920 is pulled into the first position 'FP' based on tension of the elastic member 940. In an example, the elastic member 940 can be a spring.

The software program product 900 operates the automatic fastening system 950 for the boat 110 controlled via the computer. The automatic fastening system 950 includes the plurality of fastening ropes 960 integrated into the hull of the boat 110. The plurality of fastening ropes 960 is located on motorized rollers (not shown) of the boat 110. In an example, the plurality of fastening ropes 960 can be located at various different locations on the boat 110. The cushioning effect to the plurality of fastening ropes 960 is provided by shock absorber units of the automatic fastening system 950. The automatic fastening system 950 further includes a plurality of pumps 970 that is configured to tighten the plurality of fastening ropes 960. Further, the plurality of fastening ropes 960 is tightened using pneumatic pressure produced by the plurality of pumps 970. The automatic fastening system 950 further includes a control device 980 configured to position the boat 110 by guiding the plurality of fastening ropes 960. The control device 980 is in electronic communication with the plurality of pumps 970 to mechanically lock the plurality of fastening ropes 960. In an example, the control device 980 is a joystick that is used to position the boat by guiding the plurality of fastening ropes 960. Upon reaching the port, the plurality of pumps 970 tightens the plurality of fastening ropes 960 and the control device 980 locks the plurality of fastening ropes 960 to pier structures in the port, thereby docking the boat 110 without the risk of drifting or colliding with other boats in the port.

Any features of embodiment 90 may be readily combined or permuted with any of the other embodiments 10, 20, 30, 40, 50, 60, 70, 80, 81, 91, 92, and/or 93 in accordance with the invention.

Figure 10:
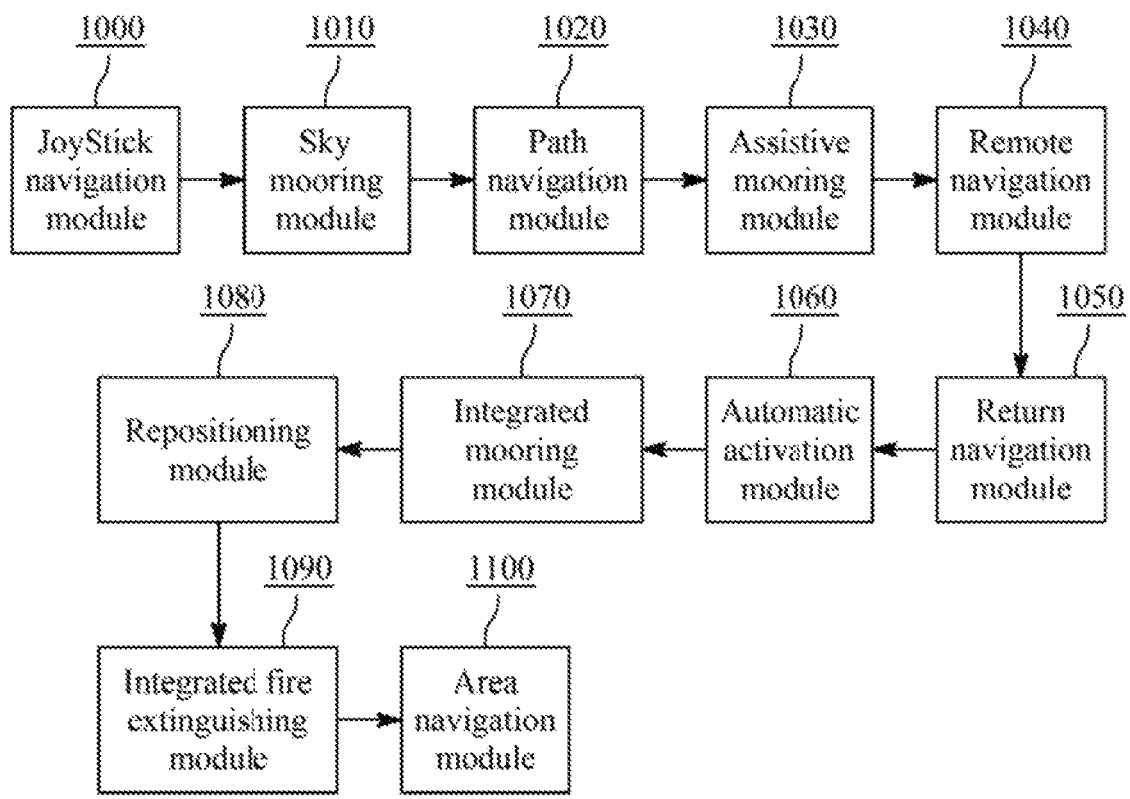
FIG. 10 demonstrates an embodiment 91 of a more elaborate system used for manoeuvring the boat, in accordance with the invention as a block diagram.

FIG. 10 demonstrates an embodiment 91 of a more elaborate system 100 used for manoeuvring the boat 110, in accordance with the invention as a block diagram. Reference numerals of the boat are from FIG. 1. In this embodiment either a control unit or an artificial intelligence module controls both the main engine of the boat and the jets or nozzles used to move the boat.

According to an embodiment, the system 100 comprises a joystick navigation mode 1000. In situations when the boat 110 is approaching the port or harbour, the operator switches from the normal navigation mode (steering wheel) to the joystick navigation mode 1000. In the joystick navigation mode 1000, in addition to the main engine of the boat, four jets enable the boat 110 to move 360 degrees with no need to turn the boat 110. Owing to the combined control of the main engine and the power source with the four nozzle jets, movement of the boat 110 is swift and precise as compared to when operated only by the four jets of the boat 110, or only by the main engine. The system 100 further comprises a sky mooring module 1010. The operator with the use of a mobile communication device can halt the boat 110 next to the pier. In an example, the mobile communication device is connected to the system 100. More particularly, the operator can put the boat 110 in a stand still mode against the wind, current, and waves, with one touch on the mobile communication device. In an embodiment, the rough position of the boat 110 is determined by the global positioning system (GPS) 300 and more accurately determined by multiple sensors, thereby assisting the operator to halt the boat 110 next to the pier without the risk of drifting and colliding. In particular, the sky mooring module 1010 enables and provides the operator with the current position of the boat 110 so as to avoid collision with other boats near the pier.

The system 100 further comprises a path navigation module 1020. The path navigation module 1020 provides a predetermined path to be traversed by the boat 110. As mentioned, due to the connection between the mobile communication device and the system 100, the operator can select a spot on the map towards which the boat 110 is expected to move with a speed chosen by the operator. The system 100 comprises an assistive mooring module 1030. In an embodiment, when the boat 110 is approaching the pier and ready to be moored, the operator can select can select sideways mooring to port or starboard side, bow mooring or stern mooring based on the circumstances. More particularly, multiple sensors sense the surrounding and the AI module or control unit maintains a predefined distance from the surrounding structures and obstacles, thereby controlling the nozzles and the main engine to position the boat 110 to the moor. Upon positioning the boat 110 to the moor, the human operator can attach the mooring lines while the boat 110 moves into its docking position. When docked, the human operator can step out of the boat 110 and attach the plurality of fastening ropes 750 to the port while the boat 110 stands still as maintained by the AI module or control unit without the risk of drifting and colliding near the port.

The system 100 further comprises a remote navigation module 1040. As mentioned earlier, due to the connection between the mobile communication device and the system 100, the operator receives an input from a remote location, for example near the pier, to control the boat 110 remotely when in the joystick navigation mode 1000. With the help of the mobile communication device, the operator can bring about 360 degrees of movement to the boat 110 without the need to turn the boat 110 manually. The system 100 includes a return navigation module 1050 that manoeuvres the boat 110 to retrace a travelled path of the boat 110. By reversing the tracked route, the operator can cause the return movement of the boat 110 without anyone on-board. The boat 110 can be used as an unmanned tender between the port and other boats. The system 100 further includes an automatic activation module 1060. When the operator approaches the boat 110, the connected mobile communication device activates the system 100 such that by the time the boat is detached the boat 110 is ready for movement.

The system 100 further comprises an integrated mooring module 1070. As the boat 110 approaches the port, the operator can either "push button launch" the plurality of fender bags 710 or it can be a set to launch with the joystick navigation mode 1000. In an example, there may be three mooring units on both sides of the boat 110. Each of the units includes a rolled, pneumatically fillable plurality of fender bags 710 and a rolled mooring rope with shock absorption. Owing to such components on-board, the mooring process is effortless and "hassle free". The system 100 further comprises a repositioning module 1080. Upon disembarking the passengers and the goods from the boat 110, the operator or AI (Artificial Intelligence) module or control unit can reposition the boat 110 into the middle of a berth further away from the pier preventing the chafe with the pier or neighbouring boat for example. Further, repositioning of the boat 110 takes place interactively using the connected mobile communication device. In an embodiment, all the mooring units are connected to cooperate and this way the operator can move and rotate the boat 110 by handling the icon of the boat 110 on the application screen in the mobile communication device. The system 100 further includes an integrated fire extinguishing module 1090. With the presence of four jet pumps and multiple sensors, an integrated fire extinguishing system protects the boat 110 while navigating or mooring the boat 110. Further, the system 100 comprises an area navigation module 1100. In the area navigation module 1100, the operator can define the navigable (or non-navigable) area using the navigation software, thereby enabling the boat 110 to be positioned in safe areas.

Any features of embodiment 91 may be readily combined or permuted with any of the other embodiments 10, 20, 30, 40, 50, 60, 70, 80, 81, 90, 92, and/or 93 in accordance with the invention.

Figure 11:
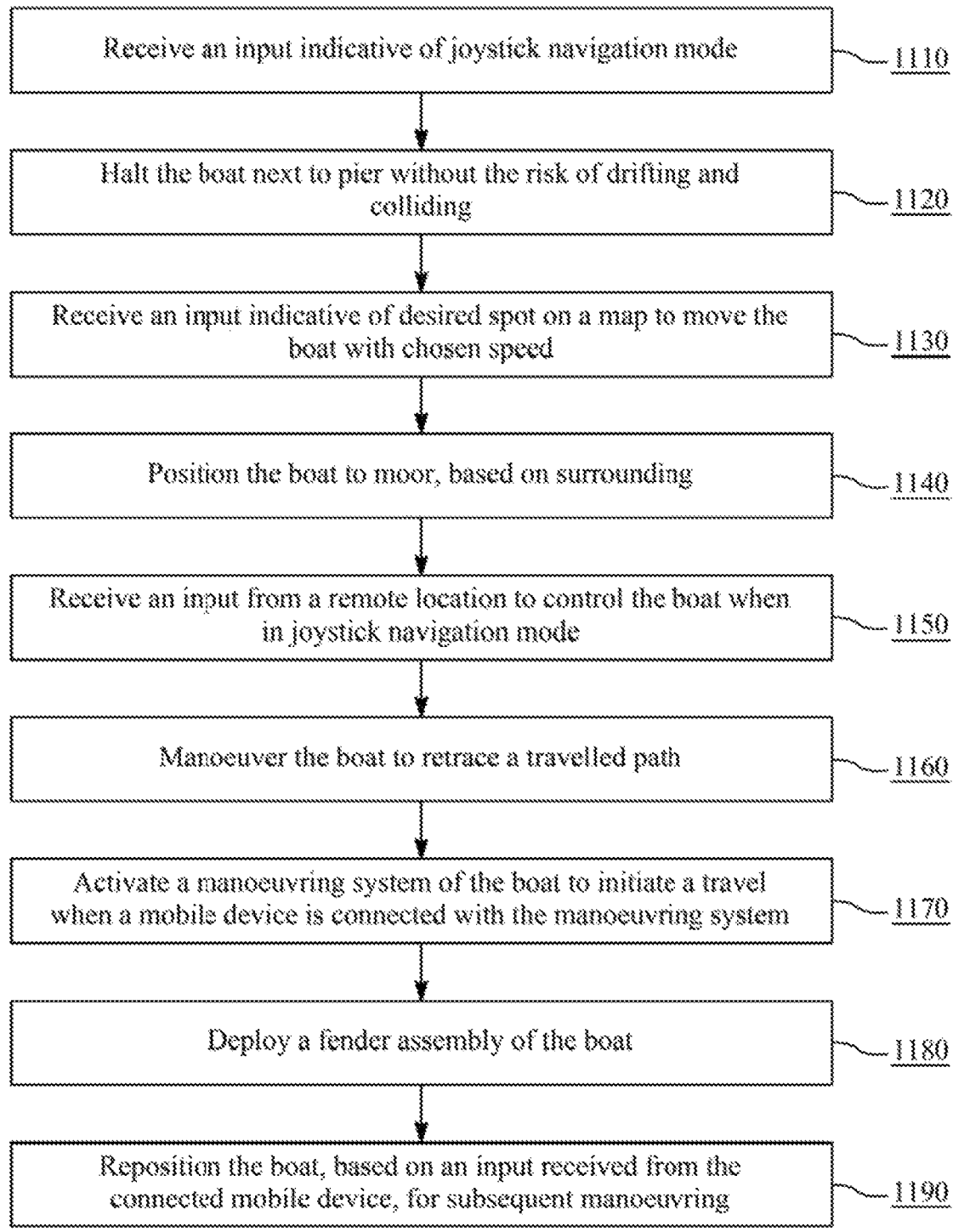
FIG. 11 demonstrates an embodiment 92 of a more elaborate method for operating the boat, in accordance with the invention as a flow diagram.

FIG. 11 demonstrates an embodiment 92 of a method for manoeuvring the boat 110 in a predefined path, in accordance with the invention as a flow diagram. The method could be implemented in a system identical or similar to embodiment 91 in FIG. 10 for example, as discussed in the other parts of the description. An end-user of the method could use a user interface identical or similar to that disclosed with embodiment 91 in FIG. 10. Reference numerals of the boat in FIG. 1 are used.

In phase 1110, receive an input indicative of the joystick navigation mode 1000. In the joystick navigation mode 1000, in addition to the main engine of the power source 130 of the boat 110, four jets enable the boat 110 to move 360 degrees with no need to turn the boat 110 with a rudder, but in some embodiments the AI module controls the rudder too.

In phase 1120, halt the boat 110 next to pier without the risk of drifting and colliding. In an example, the rough position of the boat 110 is determined by a global positioning system and more accurately determined by sensors, thereby assisting an operator to halt the boat 110 next to the pier.

In phase 1130, receive an input indicative of desired spot on a map to move the boat 110 with chosen speed. In an example, the operator selects a spot on the map using a mobile device to move the boat 110 with chosen speed.

In phase 1140, based on the surrounding, the boat is positioned to moor. More particularly, multiple sensors sense the surrounding and maintain a predefined distance from the surrounding structures and obstacles, thereby assisting the operator to position the boat 110 to the moor.

In phase 1150, receive an input from a remote location to control the boat 110 when in joystick navigation mode 1000. In particular, the operator can control the boat 110 movement with the help of the mobile device.

In phase 1160, the boat 110 is manoeuvred to retrace a travelled path. The operator can return the boat 110 without anyone inboard by reversing the tracked route.

In phase 1170, the system 100 for manoeuvring the boat is activated to initiate a travel when the mobile device is connected with the system 100.

In phase 1180, the plurality of fender bags 720 of the boat 110 is deployed. When the boat 110 is approaching the port, operator can either "push button launch" the plurality of fender bags 710 or it can be a set to launch with the joystick navigation mode 1000.

In phase 1190, the boat 110 is repositioned, based on an input received from the connected mobile device, for subsequent manoeuvring. In an example, repositioning of the boat 110 is achieved interactively using the connected mobile device and the mooring units are connected to cooperate and thereby the operator can move and rotate the boat 110 by handling the icon of the boat 110 on the application screen.

Any features of embodiment 92 may be readily combined or permuted with any of the other embodiments 10, 20, 30, 40, 50, 60, 70, 80, 81, 90, 91 and/or 93 in accordance with the invention.

Figure 12:
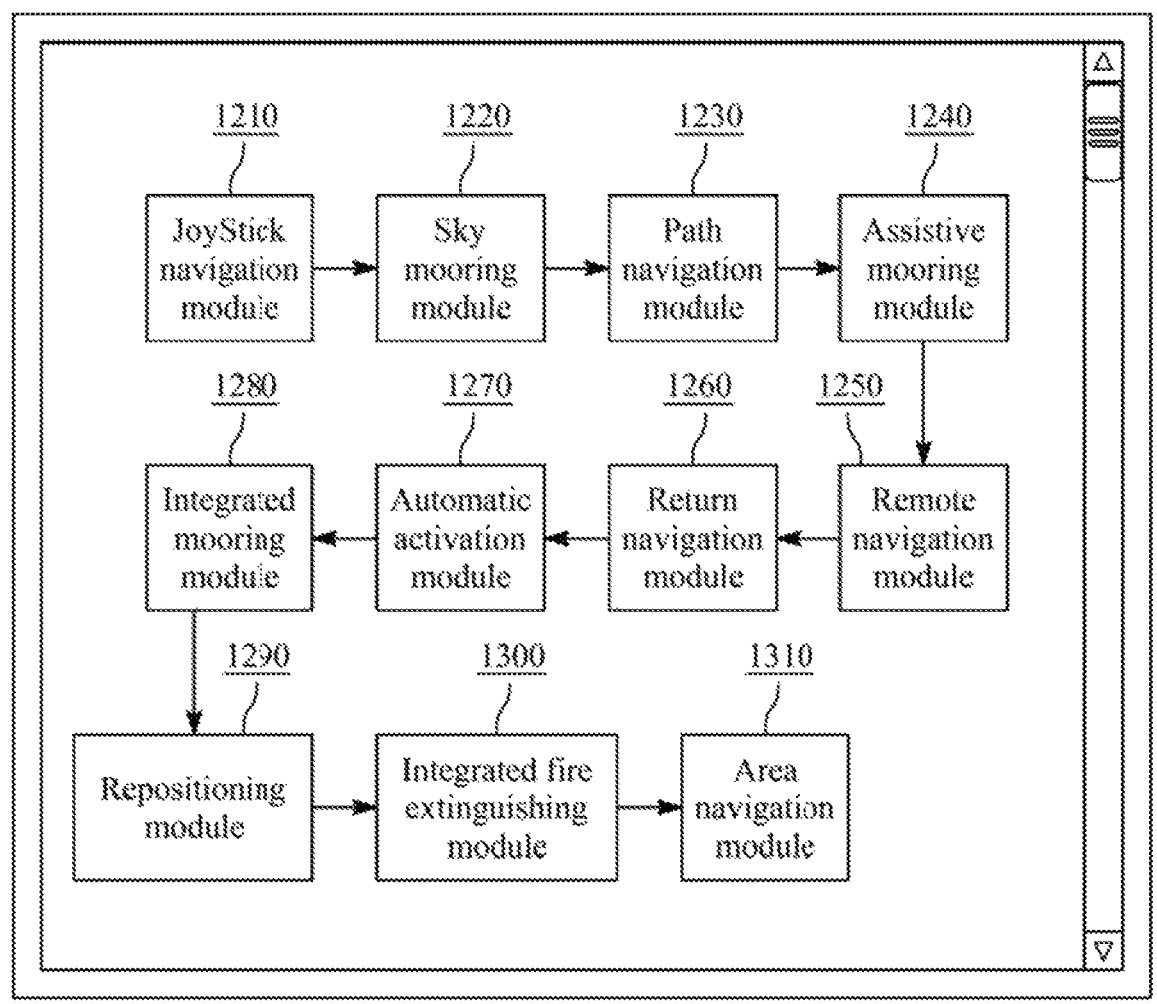
FIG. 12 demonstrates an embodiment 93 of a more elaborate software user interface of the artificial intelligence, in accordance with the invention as a screen shot diagram.

FIG. 12 demonstrates an embodiment 93 as a screen shot diagram of a more elaborate artificial intelligence boat's software user interface 1200 (hereinafter referred to as "the user interface 1200"), in accordance with the invention. Reference numerals of FIG. 1 and FIG. 7 are used. In an embodiment, the artificial intelligence module 160 can be embodied as a controller and may include the artificial intelligence boat's software that is configured to perform one or more functionality described with respect to FIG. 10.

Figure 13:
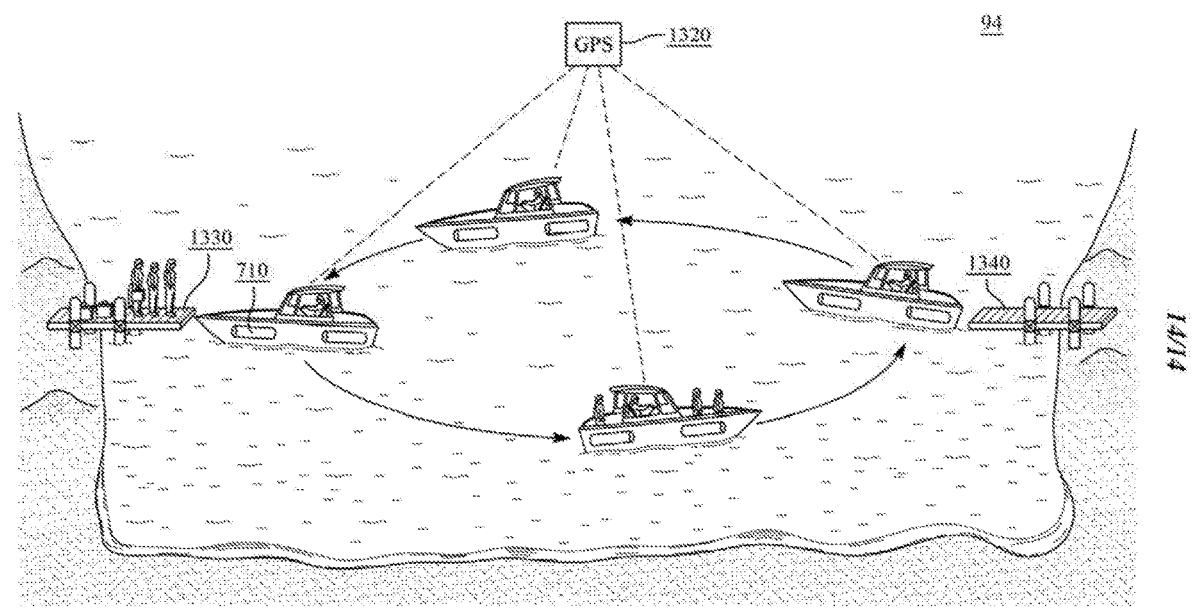
FIG. 13 demonstrates an embodiment 94 of a self-steering boat that navigates to a port and updates an operator via a mobile communication device application of the operator, in accordance with the invention as a pictorial diagram.

In an example, the mobile communication device of the operator, disposed in communication with the system 100, can include the user interface 1200. The mobile communication device, through the user interface 1200, allows the operator to communicate one or more commands to the system 100. Further, the AI boat's software may be an application fed in the mobile communication device, and capable of receiving commands from the operator to control the manoeuvring of the AI boat based on the received commands. In operation, the mobile communication device, in particular the application of the mobile communication device, receives an input from the global positioning system (GPS) 1320 indicative of the nearest port (such as a second port 1330 shown in FIG. 13) and requirement of the AI boat to arrive at such port 1330. On receipt of such input, the application may provide a notification to the operator, which may be displayed on the user interface 1200. In order to reach such port 1330, the operator may manoeuvre the boat 110 in manual mode or the joystick navigation mode 1210. Shifting from the manual mode to the joystick navigation mode 1210 may be enabled through the application. Additionally, interchanging between the manual mode and the joystick navigation mode 1210 may happen at any given point of time during a course of travel of the boat 110. Options for shifting from the manual mode to the joystick navigation mode 1210, or interchanging between the two modes anytime during travel of the boat 110, may be provided in the application in form of touch-sense buttons.

The application may also provide additional options to the operator at the time of shifting from the manual mode to the joystick navigation mode 1210. For example, the application may include options to remember a path of travel of the boat 110, to vary the speed of travel of the boat 110, and to select a direction to traverse for reaching the desired port. In an embodiment, the operator may choose to select the manual mode for reaching the port 1330. Upon selection of the manual mode, the operator is provided with an option to remember the travel path by storing the coordinates of the path traversed by the boat 110 in the memory of the artificial intelligence module 160. Additionally, the operator can also decide the travel path for the port 1330. Alternatively, the operator may select the joystick navigation mode 1210 in which the operator can remember the path of travel of the boat 110, vary the speed of travel of the boat 110, and select the direction to traverse for reaching the port 1330. Further, while approaching the port 1330, in any of the two modes such as, the manual mode and the joystick navigation mode 1210, the plurality of fender bags 710 can be deployed manually or automatically.

In the manual mode, the operator can manually deploy the plurality of fender bags 710 upon identifying obstacles near the port 1330 to prevent the boat 110 from colliding with other boats near the port 1330. In the joystick navigation mode 1210, the plurality of fender bags 710 can either deployed manually by the operator and/or automatically by the multiple sensors to prevent the boat 110 from colliding with other boats near the port 1330. Further, upon reaching the port 1330, the boat 110 is docked for transporting passenger's and goods. At the port 1330, the mobile communication device, in particular the application of the mobile communication device, receives an input from the global positioning system (GPS) 1320 indicative of the next nearest port (such as a port 1340 shown in FIG. 13) and requirement of the AI boat to arrive at such port 1340. On receipt of such input, the application may provide a notification to the operator, which may be displayed on the user interface 1200. In order to reach such port 1340, the operator may manoeuvre the boat 110 in manual mode or the joystick navigation mode 1210. In an example, the cycle of operation to reach the port 1340 is similar to the cycle of operation to reach the port 1330. In addition, the boat 110 can retrace the path traversed by the boat to reach the port 1330 from the port 1340, as the boat 110 is capable of remembering the travel path of the boat 110.

Any features of embodiment 93 may be readily combined or permuted with any of the other embodiments 10, 20, 30, 40, 50, 60, 70, 80, 81, 90, 91, and/or 92 in accordance with the invention.

The invention has the great advantage that it allows to manoeuvre a recreational boat accurately and automatically with almost no experience of seamanship.

In some embodiments the propulsion systems, ropes, fenders and other devices of the boat may be controlled via a remote control that may be a dedicated remote control or realised with a mobile phone, which has application software implementing remote controls. By remotely controlling the ropes, fenders and/or propulsions systems of the boat, the boat can be moved by loosening, adjusting or tightening ropes, pushing out or pulling in fenders and/or activating and/or deactivating all or some parts of the propulsion systems, or locked into place by remotely locking the ropes. The remote control may be manually operated or it may be sending automatic control commands to the boat for execution.

Especially the fenders are preferably configured to be operated automatically, because operating the fenders all over the boat takes a lot of attention from the captain and crew. In preferable embodiments of the invention, the fenders are pushed out automatically to the sides of the boat, for example by filling the fenders with water, if an obstacle is detected close to the boat. This is used to realise automatic collision prevention for the boat. Similarly, a change in the position of the water surface level surrounding the boat can be detected for example by the sensors, and the fenders can be automatically repositioned to shield the boat in the changed depth position. In some embodiments the position of the fenders is automatically controlled based on wave height around the boat. In some embodiments if position of the boat is changed due to external factors, for example wind pushing the boat, the fenders may be automatically lowered to protect the boat.

The fastening rope system and the fenders may be deployed on a conventional boat as well as a boat controlled by an artificial intelligence unit. In some embodiments the fenders may be filled with pressurised air released from a pressurised gas bottle or tank, so that the filling process is rapid and the boat is protected fast. Similarly, retractment is fast by release of gas from the fender.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. A collision prevention system for a boat controlled via a computer, characterised in that,
    a plurality of fender bags is disposed at a periphery of a body of the boat, and are configured to operate between a first position (FP) and a second position (SP) based on filling of water therein, each fender bag is at an expanded condition in the second position (SP) and is at a contracted condition in the first position (FP); and
    an elastic member is attached to each of the plurality of fender bags, the elastic member is configured to pull each fender bag to the first position (FP) from the second position (SP) when water is drained from the fender bag, wherein a plurality of sensors is configured to provide data to the computer controlling the collision prevention system and the sensors involve any of the following: a magnitude sensor, a gyro sensor, a Three-Dimensional mapping sensor, a LIDAR sensor, a LASER sensor an ultrasound sensor, a three-dimensional video sensor, a two-dimensional video sensor, location sensor, GPS, AGPS, location sensor using Wi-Fi or cellular base station triangulation techniques or base station IDs, parking radar, docking radar, an acceleration sensor, and/or a water pressure sensor.

2. The system of claim 1, wherein the plurality of fender bags move to the second position (SP) from the first position (FP) based on an input received from multiple sensors and/or motion data.

3. The system of claim 1, wherein the plurality of fender bags automatically retract to the first position (FP) from the second position (SP).

4. The system of claim 1, wherein the plurality of fender bags is pulled into the first position (FP) based on pressure and weight of the water and tension of the elastic member.

5. The system of claim 1, wherein an artificial intelligence module is configured to control the fenders and compensate for motion of the boat when loaded, and/or wherein the artificial intelligence module is configured to control nozzle-specific ejection of water from the boat and/or main engine of the boat and/or the rudder of the boat together with the fenders and/or fastening ropes.

6. The system of claim 1 further comprising an interface operated by a user to control the position and direction of the fenders of the boat in water.

7. The system of claim 1, wherein the artificial intelligence module is configured to be in communication with a global positioning system (GPS) and/or an assisted global positioning system (AGPS), the global positioning system and/or the assisted global positioning system are configured to provide location data to the artificial intelligence module to determine the stationary standstill or chosen course of motion of the boat, and the plurality of sensors are configured to identify obstacles created by pier structures, thereby precisely determining the stationary standstill or chosen course of motion of the boat and the fenders and/or the ropes are controlled accordingly by the artificial intelligence module.

8. A software program product stored in a memory medium for a collision prevention system for a boat controlled via a computer, characterised in that, a plurality of fender bags are is disposed at a periphery of a body of the boat, and are configured to operate between a first position and a second position based on filling of water therein, and each fender bag is at an expanded condition in the second position and is at a contracted condition in the first position; and
    an elastic member is attached to each of the plurality of fender bags, the elastic member is configured to pull each fender bag to the first position from the second position thereof when water is drained from the fender bag, wherein a plurality of sensors is configured to provide data to the computer controlling the collision prevention system and the sensors involve any of the following: a magnitude sensor, a gyro sensor, three-dimensional mapping sensor, a LIDAR sensor, a LASER sensor, an ultrasound sensor, a three-dimensional video sensor, a two-dimensional video sensor, location sensor, GPS, AGPS, location sensor using Wi-Fi or cellular base station triangulation techniques or base station IDs, parking radar, docking radar, acceleration sensor and/or a water pressure sensor.

9. The software program product as claimed in claim 8, characterised in that, wherein the plurality of fender bags move to the second position from the first position based on an input received from multiple sensors and/or motion data.

10. The software program product as claimed in claim 8, characterised in that, wherein the plurality of fender bags automatically retract to the first position from the second position.

11. The software program product as claimed in claim 8, characterised in that, wherein the plurality of fender bags is pulled into the first position based on pressure and weight of the water and tension of the elastic member.

12. The software program product as claimed in claim 8, characterised in that, wherein an artificial intelligence module is configured to control the fenders and to compensate for motion of the boat when loaded and type of the boat, and/or wherein the artificial intelligence module (650) is configured to control nozzle-specific ejection of water from the boat and/or main engine of the boat and/or the rudder of the boat together with the fenders and/or fastening ropes.

13. The software program product as claimed in claim 8, characterised in that, further comprising an interface operated by a user to control the position and direction of the fenders of the boat in water.

14. The software program product as claimed in claim 8, characterised in that, wherein the artificial intelligence module is configured to be in communication with a global positioning system (GPS) and/or an assisted global positioning system (AGPS), the global positioning system and/or the assisted global positioning system are configured to provide location data to the artificial intelligence module to determine the stationary standstill or chosen course of motion of the boat, and the plurality of sensors are configured to identify obstacles created by pier structures, thereby precisely determining the stationary standstill or chosen course of motion of the boat and the fenders and/or the ropes are controlled accordingly by the artificial intelligence module.

15. A method of operating a collision prevention system for a boat controlled via a computer, characterised in that,
    disposing a plurality of fender bags at a periphery of a body of the boat, configured to operate between a first position and a second position based on filling of water therein, each fender bag is at an expanded condition in the second position and is at a contracted condition in the first position; and
    attaching an elastic member to each of the plurality of fender bags, the elastic member is configured to pull each fender bag to the first position from the second position thereof when water is drained from the fender bag, wherein a plurality of sensors is configured to provide data to the computer controlling the collision prevention system and the sensors involve any of the following: a magnitude sensor, a gyro sensor, a three-dimensional mapping sensor, a LIDAR sensor, a LASER sensor, an ultrasound sensor, a three-dimensional video sensor, a two-dimensional video sensor, location sensor, GPS, AGPS, location sensor using Wi-Fi or cellular base station triangulation techniques or base station IDs, parking radar, docking radar, an acceleration sensor and/or a water pressure sensor.

16. The method as claimed in claim 15, characterised in that, moving the plurality of fender bags to the second position from the first position based on an input received from multiple sensors and/or motion data.

17. The method as claimed in claim 15, characterised in that, retracting the plurality of fender bags automatically to the first position from the second position.

18. The method as claimed in claim 15, characterised in that, pulling the plurality of fender bags into the first position based on pressure and weight of the water and tension of the elastic member.

19. The method as claimed in claim 15, characterised in that, configuring an artificial intelligence module to control the fenders and to compensate for motion of the boat when loaded, and/or wherein the artificial intelligence module is configured to control nozzle-specific ejection of water from the boat and/or main engine of the boat and/or the rudder of the boat together with the fenders and/or fastening ropes.

20. The method as claimed in claim 15, characterised in that, further comprising an interface operated by a user to control the position and direction of the fenders of the boat in water.

21. The method as claimed in claim 15, characterised in that, configuring the artificial intelligence module to be in communication with a global positioning system (GPS) and/or an assisted global positioning system (AGPS), the global positioning system and/or the assisted global positioning system are configured to provide location data to the artificial intelligence module to determine the stationary standstill or chosen course of motion of the boat, and the plurality of sensors are configured to identify obstacles created by pier structures, thereby precisely determining the stationary standstill or chosen course of motion of the boat and the fenders and/or the ropes are controlled accordingly by the artificial intelligence module.

* * * * *